United States Patent
Elle et al.

(10) Patent No.: US 10,409,296 B1
(45) Date of Patent: Sep. 10, 2019

(54) SYSTEM FOR CONTINUOUS-FLOW IRRIGATION VALVE ACTIVATION AND MONITORING

(71) Applicant: ECO-DRIP IRRIGATION SYSTEMS, INC., Abernathy, TX (US)

(72) Inventors: Eric A. Elle, Lubbock, TX (US); Clay Weston, New Braunfels, TX (US); John Meyo, Lancaster, NY (US)

(73) Assignee: ECO-DRIP IRRIGATION SYSTEMS, INC., Abernathy, TX (US)

( * ) Notice: Subject to any disclaimer, the term of this patent is extended or adjusted under 35 U.S.C. 154(b) by 294 days.

(21) Appl. No.: 15/456,831

(22) Filed: Mar. 13, 2017

(51) Int. Cl.
  G05D 7/06 (2006.01)
  B05B 1/30 (2006.01)
  A01G 25/16 (2006.01)

(52) U.S. Cl.
  CPC ........... G05D 7/0635 (2013.01); A01G 25/16 (2013.01); B05B 1/30 (2013.01)

(58) Field of Classification Search
  None
  See application file for complete search history.

(56) References Cited

U.S. PATENT DOCUMENTS

| | | | |
|---|---|---|---|
| 3,860,172 A | 1/1975 | Platt | |
| 4,032,072 A * | 6/1977 | McElhoe | B05B 15/50 239/11 |
| 4,226,366 A | 10/1980 | Nortoft | |
| 4,256,133 A * | 3/1981 | Coward | A01G 25/16 137/624.11 |
| 4,646,224 A * | 2/1987 | Ransburg | A01G 25/16 137/624.18 |
| 5,048,755 A * | 9/1991 | Dodds | A01G 25/16 137/78.2 |
| 5,337,957 A | 8/1994 | Olson | |
| 5,465,904 A * | 11/1995 | Vaello | A01G 25/16 239/69 |
| 5,479,338 A * | 12/1995 | Ericksen | A01G 25/16 137/624.2 |
| 5,661,349 A * | 8/1997 | Luck | A01G 25/16 307/130 |
| 6,003,783 A | 12/1999 | Hunter | |
| 6,102,061 A | 8/2000 | Addink | |
| 6,220,293 B1 * | 4/2001 | Rashidi | A01G 25/16 137/624.12 |

(Continued)

FOREIGN PATENT DOCUMENTS

| JP | 1984 59082966 | 5/1984 |
|---|---|---|
| JP | 1993 05304846 | 11/1993 |

*Primary Examiner* — Ramesh B Patel

(57) ABSTRACT

An irrigation control circuit board is provided, comprising a microprocessor, a plurality of output terminals configured for providing an output current to an irrigation valve in order to actuate the irrigation valve, a voltage boosting circuit, including a DC-DC converter and an output current boost capacitor, wherein the voltage boosting circuit boosts the output current to an actuating voltage, the actuating voltage being sufficient to actuate an irrigation valve and the actuating voltage being supplied to an irrigation valve driver, a power mitigation circuit configured to limit current spikes to the voltage boosting circuit, and at least one shunt monitor configured to monitor the output current as it is transferred between the irrigation valve driver and the plurality of output terminals.

20 Claims, 18 Drawing Sheets

(56) References Cited

U.S. PATENT DOCUMENTS

| | | | |
|---|---|---|---|
| 6,227,220 B1 | 5/2001 | Addink | |
| 6,298,285 B1 | 10/2001 | Addink et al. | |
| 6,402,048 B1 | 6/2002 | Collins | |
| 6,453,215 B1 * | 9/2002 | Lavoie | A01G 25/16 137/624.11 |
| 6,490,505 B1 * | 12/2002 | Simon | A01G 25/165 137/624.11 |
| 6,507,775 B1 * | 1/2003 | Simon | A01G 25/16 137/624.11 |
| 6,688,535 B2 | 2/2004 | Collins | |
| 6,694,223 B1 * | 2/2004 | Goldberg | A01G 25/165 137/624.11 |
| 7,203,576 B1 | 4/2007 | Wilson et al. | |
| 7,339,957 B2 * | 3/2008 | Hitt | A01G 25/167 370/280 |
| 7,526,365 B1 * | 4/2009 | Frerich | A01G 25/00 137/624.13 |
| 9,049,821 B1 * | 6/2015 | Hanna | A01G 25/16 |
| 9,331,499 B2 * | 5/2016 | Ikriannikov | H02J 1/10 |
| 2003/0179102 A1 * | 9/2003 | Barnes | A01G 25/167 340/870.07 |
| 2007/0044978 A1 * | 3/2007 | Cohen | A01G 25/167 169/5 |
| 2015/0164008 A1 * | 6/2015 | Ferrer Herrera | A01G 25/16 251/129.04 |
| 2015/0167861 A1 * | 6/2015 | Ferrer Herrera | F16K 37/0041 239/73 |

\* cited by examiner

MODBUS ADDRESS
X = CLOSED

| S1 | S2 | S3 | S4 | ADDRESS |
|---|---|---|---|---|
| O | O | O | O | 1 |
| X | O | O | O | 2 |
| O | X | O | O | 3 |
| X | X | O | O | 4 |
| O | O | X | O | 5 |
| X | O | X | O | 6 |
| O | X | X | O | 7 |
| X | X | X | O | 8 |
| O | O | O | X | 9 |
| X | O | O | X | 10 |
| O | X | O | X | 11 |
| X | X | O | X | 12 |
| O | O | X | X | 13 |
| X | O | X | X | 14 |
| O | X | X | X | 15 |
| X | X | X | X | 16 |

FIG. 4C

TYPICAL TRANSFER CHARACTERISTIC

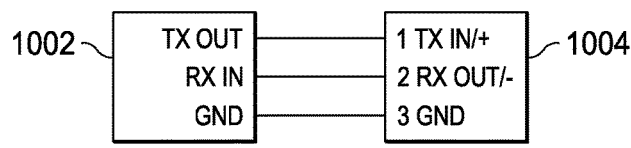
FIG. 10A
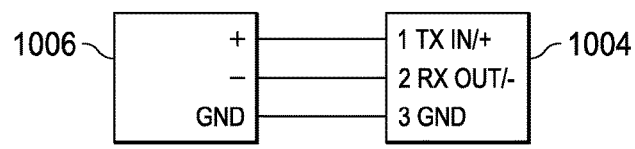
FIG. 10B
FIG. 10C
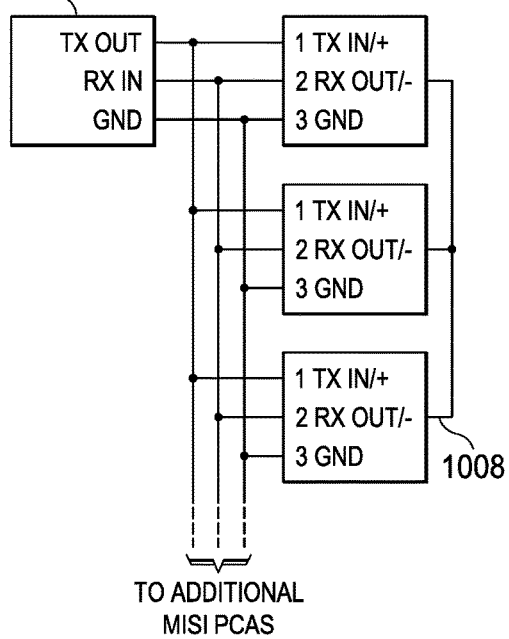
FIG. 10D
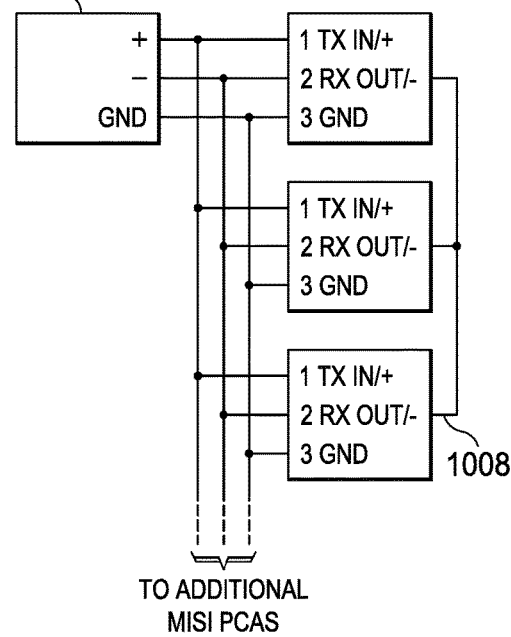

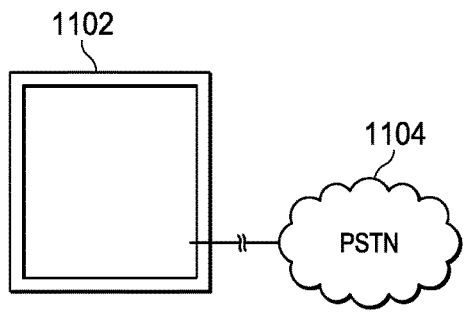
FIG. 11A
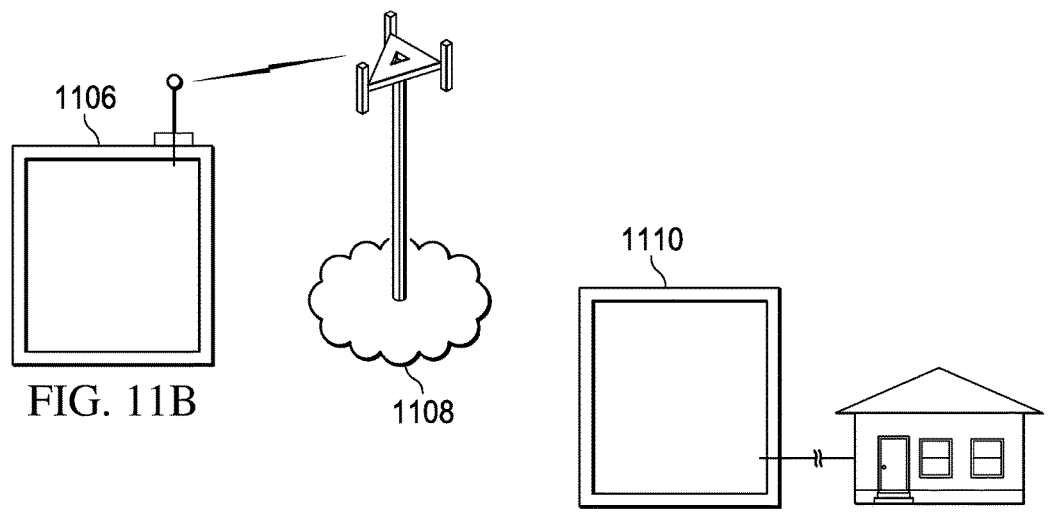
FIG. 11B
FIG. 11C
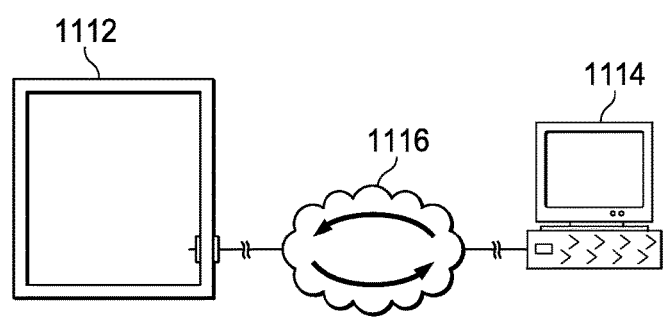
FIG. 11D

SYSTEM FOR CONTINUOUS-FLOW IRRIGATION VALVE ACTIVATION AND MONITORING

TECHNICAL FIELD

The disclosed subject matter relates to systems and methods for irrigation control.

BACKGROUND

The term deficit irrigation is used to describe the situation where all available water from a given water source is used to irrigate a given parcel of land. Frequently, the source cannot supply sufficient water volume to irrigate the entire parcel simultaneously. Under these conditions, the parcel is typically subdivided into a plurality of zones, and the water flow is periodically directed to each zone, or to combinations of zones, such that over a given period of time each zone receives an equal share of the available water.

In deficit irrigation situations, it is not unusual to use a continuous-flow irrigation system wherein the water source operates continuously. The source may be a water well powered by a gas or electric pump. The water from the source is periodically switched between irrigation zones, but it never shuts off during normal operations.

Systems for managing water distribution to irrigation zones often have limitations that affect the scheduling and operation of irrigation valves, as well as limitations on the ability to monitor and gather information concerning the irrigation zones which the irrigation valves serve. Accordingly, what is needed are a system and method that addresses such issues.

SUMMARY

In one aspect thereof, an irrigation control circuit board is provided. The irrigation control circuit board comprises a microprocessor and a plurality of output terminals configured for providing an output current to an irrigation valve in order to actuate the irrigation valve. The irrigation control circuit board further comprises a voltage boosting circuit that includes a DC-DC converter and an output current boost capacitor, wherein the voltage boosting circuit boosts the output current to an actuating voltage, the actuating voltage being sufficient to actuate an irrigation valve and the actuating voltage being supplied to an irrigation valve driver. The irrigation control circuit board further comprises a power mitigation circuit configured to limit current spikes to the voltage boosting circuit and at least one shunt monitor configured to monitor the output current as it is transferred between the irrigation valve driver and the plurality of output terminals.

In another embodiment, the actuating voltage is 15 volts.

In another embodiment, the output current boost capacitor has a capacitance of 4700 microfarads.

In another embodiment, the power mitigation circuit limits current spikes to less than 14 amperes.

In another embodiment, the irrigation control circuit board further comprises a plurality of input terminals, each one of the plurality of input terminals configured to increment a counter for each time an irrigation valve is actuated.

In another embodiment, the irrigation control circuit board further comprises a communications interface configured to receive and transmit information using RS-232 or RS-485 protocols.

In another embodiment, the irrigation control circuit board further comprises a plurality of communication interface selection switches configured to allow for the selection of using either RS-232 or RS-485 protocol.

In another embodiment, the actuating voltage is 24 volts.

In another embodiment, the irrigation control circuit board further comprising a plurality of output LEDs configured to provide a plurality of status indicators.

In another aspect thereof, an irrigation control system is provided. The irrigation control system comprises a host and at least one valve controller. The at least one valve controller includes an irrigation control circuit board. The irrigation control circuit board includes a microprocessor, a plurality of output terminals configured for providing an output current to an irrigation valve in order to actuate the irrigation valve, and a voltage boosting circuit, which includes a DC-DC converter and an output current boost capacitor, wherein the voltage boosting circuit boosts the output current to an actuating voltage, the actuating voltage being sufficient to actuate an irrigation valve and the actuating voltage being supplied to an irrigation valve driver. The irrigation control circuit board further includes a power mitigation circuit configured to limit current spikes to the voltage boosting circuit and at least one shunt monitor configured to monitor the output current as it is transferred between the irrigation valve driver and the plurality of output terminals. The irrigation control system further includes a telemetry circuit board, which includes a plurality of sensor input terminals for connecting to a plurality of sensors and an integrated radio configured to allow for wireless communication between the telemetry circuit board and the plurality of sensors, as well as to the host or the irrigation control circuit board.

In another embodiment, the at least one valve controller is connected to the host via the communications interface.

In another embodiment, the at least one valve controller is connected to other valve controllers via the communications interface.

BRIEF DESCRIPTION OF THE DRAWINGS

For a more complete understanding, reference is now made to the following description taken in conjunction with the accompanying Drawings in which:

FIG. 4C illustrates one embodiment of the addressability of devices connected to the valve control board of FIG. 2;

FIG. 10A illustrates an RS-232 point-to-point configuration of a valve controller;

FIG. 10B illustrates an RS-485 point-to-point configuration of a valve controller;

FIG. 10C illustrates an RS-232 multidrop configuration of a plurality of valve controllers;

FIG. 10D illustrates an RS-485 multidrop configuration of a plurality of valve controllers;

FIG. 11A illustrates a valve controller incorporating a wired modem for remote activation in accordance with another embodiment;

FIG. 11B illustrates a valve controller incorporating a wireless modem for remote activation in accordance with another embodiment;

FIG. 11C illustrates a valve controller incorporating a RS232 data interface for remote activation in accordance with another embodiment; and FIG. 11D illustrates a valve controller incorporating an Ethernet-type network interface for remote activation in accordance with another embodiment.

DETAILED DESCRIPTION

Figure 1:
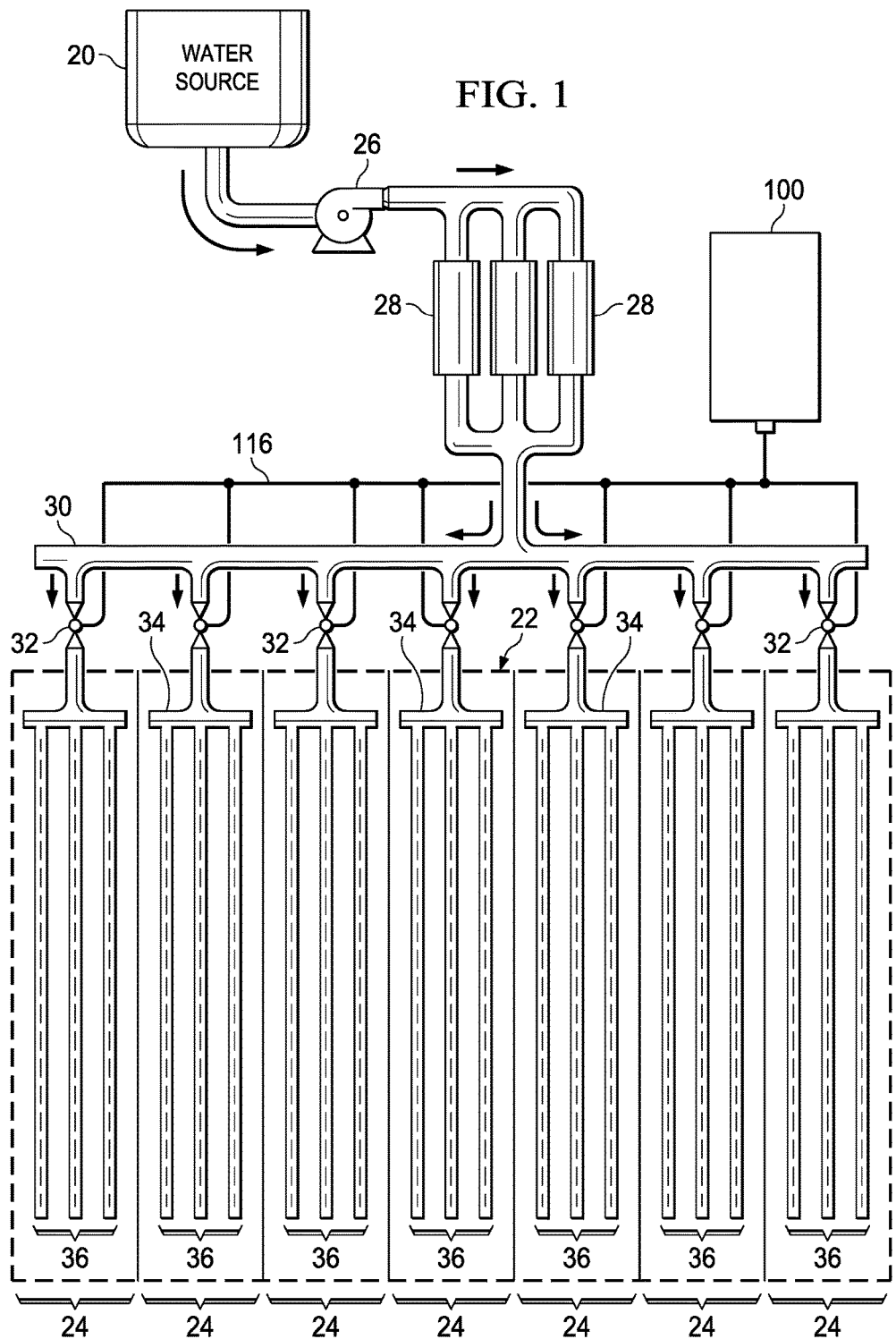
FIG. 1 illustrates an irrigation system including an irrigation valve controller in accordance with one embodiment.

Referring now to the drawings, wherein like reference numbers are used herein to designate like elements throughout, the various views and embodiments are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, an irrigation water source 20 for a given parcel of land 22 may operate continuously. The parcel of land 22 is subdivided into a plurality of zones 24. The water from the source 20 may be switched between irrigation zones. In the embodiment shown, a pump 26 is used to force the water through filters 28 and into the main header 30 of the system. Electrically-operated zone valves 32 control the flow of water from a main header 30 into a zone header 34 for each zone 24. A valve controller 100 is electrically connected via wires 116 to each of the zone valves 32, to electrically operate the zone valves 32. The zone valves 32 may be latching solenoid valves, such as the Bermad S-982-3 W valve. Latching solenoid valves utilize an electrical current pulse or internal permanent magnet material to maintain a set position without the constant application of an electrical current. While the principal of operation is similar to all linear solenoids, latching solenoids are different in that the electrical polarity is important to obtain proper operation. As the current flows in one direction, energizing the coil field in the solenoid, it adds to the pull of the permanent magnet. An armature is then attracted to a stationary pole within the solenoid. Once the armature has moved to fully travel to and contact the pole, it will remain in this position without any further electrical power input, allowing fluid to flow through the solenoid valve. To release the solenoid from this holding position, the magnet's attraction has to be cancelled by sending a current back through the coil field in the opposite direction.

Once the zone valve(s) 32 is activated, the water then flows from the zone header 34 into ducts such as drip lines 36 within each zone 24. It is desired that the water flow be periodically directed to each zone 24, or to combinations of zones, such that over a given period of time each zone receives an equal share of the available water.

Figure 2:
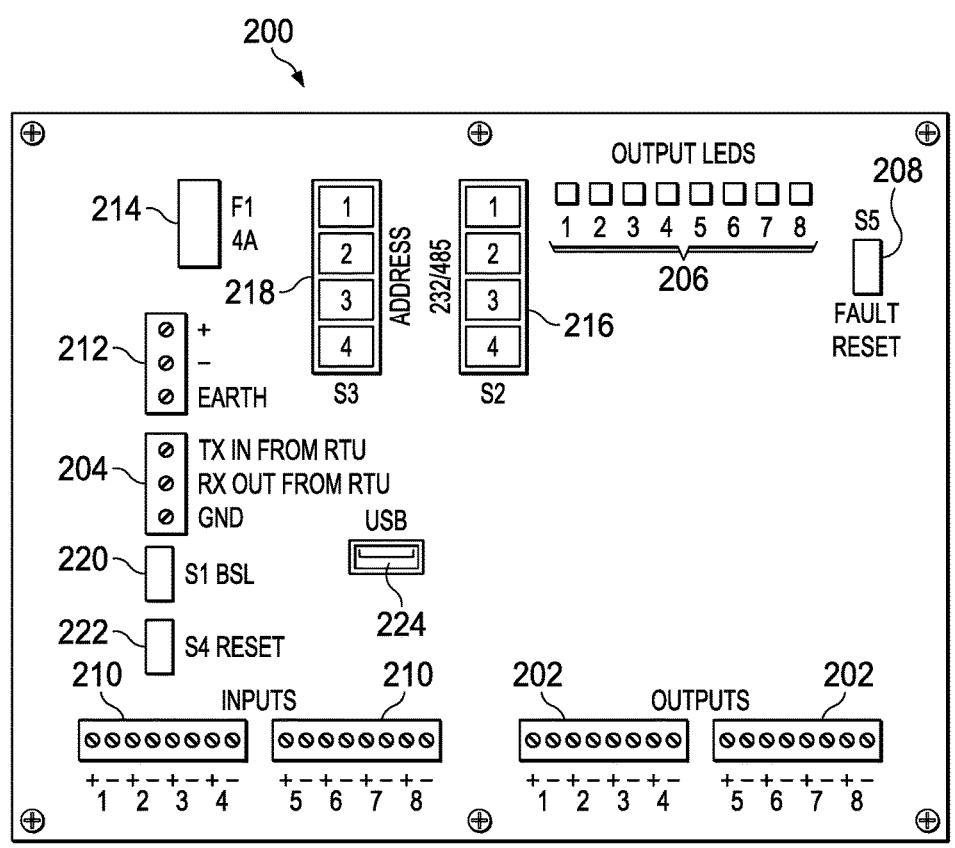
FIG. 2 illustrates one embodiment of a valve control board.

Referring now to FIG. 2, there is illustrated one embodiment of a valve control board 200. The valve control board 200 has a plurality of valve control outputs 202, wherein the plurality of valve control outputs 202 have a positive and negative polarity output for each one of the plurality of valve control outputs 202. For example, the embodiment shown in FIG. 2 provides for the control of eight solenoid valves. This requires that there be a total of sixteen wire contacts, providing for a positive and negative wire to be connected between the valve control board 200 and each solenoid valve. During operation, the valve control board 200 briefly supplies an electrical current pulse in either polarity to activate or deactivate a solenoid valve. A command to send such a pulse may be sent from a host using a communications protocol, such as Modbus protocol, and received by the valve control board 200 via a communications interface 204 located on the board 200. The host can set the duration of the pulse for each valve by writing values to registers.

For instance, the host may send a Force Single Coil On command to a valve's ON/OFF address to initiate a pulse on the positive or + terminal of an output to open the associated solenoid valve. Similarly, the host may send a Force Single Coil Off command to a valve's ON/OFF address to initiate a pulse on the negative or − terminal of an output to close the associated solenoid valve. Thus, the solenoid valve must be wired with the properly polarity to ensure that an on or an off command achieves the intended purpose. In some embodiments, only one valve control output can be active at any time. If the host issues a new valve control output before processing of the previous command is complete, the previous command may be interrupted in some embodiments. In other embodiments, the current command may be completed before the new command is executed. It will be understood that, even though only one output may be active at a time, more than one solenoid valve may be in the open position at any given time, since, as described above, the electrical pulse from the valve control board 200 is only needed to activate the solenoid valve, and the valve is then able to remain open until a new pulse is sent indicating that the valve be closed. This allows for multiple valves to be open (each opened by a separate pulse) without having to supply a constant current to each valve.

The valve control board 200 also includes a plurality of LED indicators 206, each LED indicator being associated with one of the plurality of valve control outputs 202. The plurality of LED indicators 206 activate after a process or command is complete. When a valve control command is received, all of the plurality of LED indicators 206 turn off and stay off until command processing is complete. The valve control board 200 measures output current during a pulse via a shunt monitor. If the measured current is greater than a detection threshold and less than a fault threshold, the LED associated with the output through which the current was passed flashes, indicating a successful pulse. Different colors may be flashed on the LED depending on the situation. For example, in an embodiment where the plurality of LED indicators 206 are tri-color LEDs allowing for blue, green, or red colors, if the pulse is on the positive output, the LED flashes green. If the pulse was instead on the negative output, the LED flashes red. If the measured current is not within the expected range, a fault is reported and the LED flashes blue. If the fault is a low fault (open circuit) there may only be a single blue flash. If there is a high fault (short circuit) the LED may stay blue until resolved. If there is a power supply fault, such as a battery failure, all of the plurality of LEDs 206 will continuously flash blue. The board 200 includes a fault reset 208 that can be pressed to reset the currently stored fault status, resetting all fault registers to 0 and turning off all LEDs.

In the event of a power supply fault, solenoid power supply is turned off between output pulses to conserver power. When the Modbus host sends an output command to any valve, the board 200 turns on the solenoid power supply and waits for it to reach a nominal value. If the power supply fails to start up properly, the output command is aborted, a power supply fault Boolean register value is set to 1, and all blue LEDs flash until any of the following events: (1) 10 seconds elapses; (2) a new output command is received for any value; (3) the user presses the fault reset button, which turns off all LEDs and resets all fault registers to 0; (4) the host writes a Force Coil On command to the Reset Faults address, which this event also resets the power supply fault register value to 0; or (5) the board 200 is reset either by a user pressing the reset button or by interruption of battery power, which this event also resets the power supply fault register to 0.

In the event of an output current fault, which is a fault associated with current measured during an output pulse, the results are indicated by the blue LED associated with the valve and by a value in the Valve n Fault registers. If there is no fault, the value is 0. If there is a low fault, the value is set to 1. If there is a high fault, the value is set to 2. The Valve Fault registers are set to a value of 0 (indicating no fault) and all LEDs turn off when any of the following occur: (1) battery power is interrupted; (2) the reset button is pressed; (3) the reset faults button is pressed; or (4) the host writes a Force Coil On command to the Reset Faults address. An individual valve fault register (and the LED) reflect the result of the most recent completed command. Successful execution of an output command resets the valve fault register value for that output to 0. A low fault is detected if the measured current does not reach a minimum threshold. The most likely causes of a low fault are open wiring or an open coil. If a low fault is detected, the blue LED associated with the output flashes once and the value of the corresponding valve fault register is set to 1. A high fault is detected if the drive circuit reports a fault condition (due to over-current or over-temperature) or if the measured current exceeds a fault threshold. The most likely causes of a high fault are shorted wiring or a shorted coil. If a high fault is detected, the blue LED associated with the output turns on, the output turns off immediately, and the value of the corresponding valve fault register is set to 2. The blue LED associated with the faulted output stays on until any of the following events occur: (1) 10 seconds elapses; (2) a new output command is received for any value; (3) the user presses the fault reset button, which turns off all LEDs and resets all fault registers to 0; (4) the host writes a Force Coil On command to the Reset Faults address, which this event also resets the power supply fault register value to 0; or (5) the board 200 is reset either by a user pressing the reset button or by interruption of battery power, which this event also resets the power supply fault register to 0.

The board 200 also includes a plurality of inputs 210 for counting contact closures. The plurality of inputs 210 may have pluggable screw terminal connectors for field wiring. Each of the plurality of inputs 210 is associated with a zone valve 32 and a particular polarity. For example, the plurality of inputs 210 of the embodiment of the board 200 shown in FIG. 2 includes sixteen inputs, allowing for a positive and negative polarity input for eight different zone valves 32, such as eight different latching solenoids. The positive inputs may be pulled up to 3.3 VDC through a 30.1 kΩ resistor in some embodiments. The board 200 counts contact closures detected through the plurality of inputs 210, i.e., the switching between an on or off state of the zone valves 32 due to a pulse received by a zone valve 32 in the proper polarity to cause a switch. Each time a switch occurs, a counter for the associated one of the plurality of inputs 210 is incremented. The total counter value may be stored in registers, such as Modbus holding registers, with each register being addressable by the board 200. The register values may be in various formats, such as single-precision floating point values, integers, or other formats. The register values may also be reported differently than they are stored. For instance, the values may be stored as simple integers, but reported as single-precision floating point values to the user. As a practical matter, conversion between integer and floating point values in the host and the software may result in non-integer values slightly lower or higher than the actual count, such as 2.6579999e3 instead of 2658 counts. Host software may additionally round the counter values to the nearest whole number for ease of display and understanding to the user. The counters may additionally have a max value, such as 65,535 counts, wherein any additional counter increment beyond the max value will cause the stored value to roll over to 0. All counters may be reset by writing a Force Coil On command to a Reset Counter address, which may be implemented via various communications protocols, such as Modbus. The plurality of inputs 210 may additionally be protected against false counting due to contact bounce. To guard against such, conditions for an accurate count may be set for the plurality of inputs 210, such as requiring a minimum switch closed duration of 23 ms, a minimum switch open duration of 12 ms, a maximum switch bounce duration of 10 ms, a maximum switch closed resistance of 1 k ohms, and a minimum switch open resistance of 300 k ohms. The inputs may also be protected by transient voltage suppression diodes rated for at least 15 A peak surge current.

The board 200 further includes a battery power input 212 for connecting to a battery. The board 200 may require a battery between 10.5 and 13.8V, such as a standard 12V battery. The battery power input 212 includes a pluggable 3-terminal screw terminal for the power connection, having a positive, a negative, and an earth ground connector positions. The positive and negative connector positions of the battery power input connect to the positive and negative terminals of the battery, respectively. The negative connector position and the earth ground connector position are additionally connected to ground on the board 200. The battery power input 212 is protected against reverse input connection to ensure that no current flows from the battery if the positive and negative terminal connections are reversed. Current to the board 200 is limited by a replaceable 4 A fuse 214. Outputs 202 shorted to each other or to ground will not cause the fuse to blow. In order to minimize quiescent power consumption, the board 200 disconnects power from solenoid drivers when no valve is currently being actuated. When none of the plurality of LEDs 206 are lit, the board 200 is not transmitting a communication, and when a valve control command is not being processed, average power consumption can be less than 1 mA. Power consumption during commands such as Modbus commands depends on whether the board 200 is currently configured for RS-232 or RS-485 communications and the loading presented by any other connected devices. For a point-to-point RS-232 setup, BAT input current is typically less than 2 mA while the board 200 is transmitting. For a point-to-point RS-485 setup, battery input current is typically less than 15 mA while the board 200 is transmitting. When a valve on/off command is received, the board 200 connects power to a 4700 uF output current boost capacitor and turns on a DC-DC converter to step up the output voltage to 15V. BAT input current spikes as high as 15 A momentarily as the output capacitor charges. Most lead-acid batteries are capable of delivering such a current spike without issues.

Board firmware monitors the rise of the internal 15V power supply voltage. A valve control output command is not processed until the power supply voltage reaches a minimum operating threshold of about 14.25V. The power supply output typically reaches this value within 15 ms. If the power supply output does not reach the threshold within 100 ms, the board 200 sets the Power Supply Fault register value to True and aborts the valve control output command.

In some embodiments, the board 200 may be configured to produce an output voltage of 24V, instead of 15V. To accomplish such, a power supply able to provide the necessary voltage may be substituted, if needed, a larger capacitor, rated to provide up to 35V, other than capacitor C7 may be used, and the timing to boost the power to 24V may have to be adjusted to compensate for the extra voltage necessary. Other components may need to be adjusted accordingly as well. However, it will be understood that configuring the board 200 to provide 24V output voltage would not change the functionality of the board 200; rather, different components rated for providing the higher voltage would need to be substituted. The option to configure the board 200 to supply a 24V output current would be necessary when utilizing 24V solenoid valves, as such would require the 24V output for operation of the solenoid valves.

The board 200 further includes a plurality of communication interface selection switches 216. The plurality of communication interface selection switches 216 allow for the selection of RS-232 or RS-485 communications to be used. For instance, in the embodiment shown in FIG. 2, the plurality of communication interface selection switches 216 includes four switches. The four switches may have two positions: an on position and an off position. Different combinations of switches being turned on or off will allow for switching between RS-232 or RS-485 communications. For example, if switches 1 and 2 are set to the ON position, while switches 3 and 4 are set to the OFF position, RS-232 communications are enabled. If switches 3 and 4 are set to the ON position, while switches 1 and 2 are set to the OFF position, RS-485 communications are enabled. When all 4 switches are in the OFF position, both RS-232 and RS-485 ports are disabled.

The board 200 further includes a plurality of address switches 218. The plurality of address switches 218 allows for address IDs to be set. This causes the board 200 to only respond to respond to communications directed to its selected ID. If Modbus protocol is being used, for instance, the board 200 would only respond to Modbus polls having an ID field that matches the setting of the plurality of address switches 218. In the embodiment shown in FIG. 2, there are four such switches. This allows for one of sixteen different addresses to be selected, based on the combination of the four switches that are switched to the ON position. For example, if no switches are switched to the ON position, it would have an address of "1." If the first and fourth switches are switched to the ON position, the board 200 would have an address of "11."

The board 200 further includes a BSL button 220, a RESET button 222, and a USB port 224. To update the firmware of the board 200, a firmware updater application is launched on a PC. The PC is then connected to the board 200 via a USB cable connected between the PC and the USB port 224 on the board 200. The RESET button 222 is then pressed and held. While the RESET button 222 is being held the BSL button 220 is also pressed and held. The RESET button 222 is then released, followed by releasing the BSL button 220. This results in the board 200 being found by the firmware updater application, which then installs the update to the board 200. After a successful update, the board 200 resets, causing the plurality of LEDs 206 to flash, indicating that the board 200 can be disconnected from the PC.

Figure 3A:
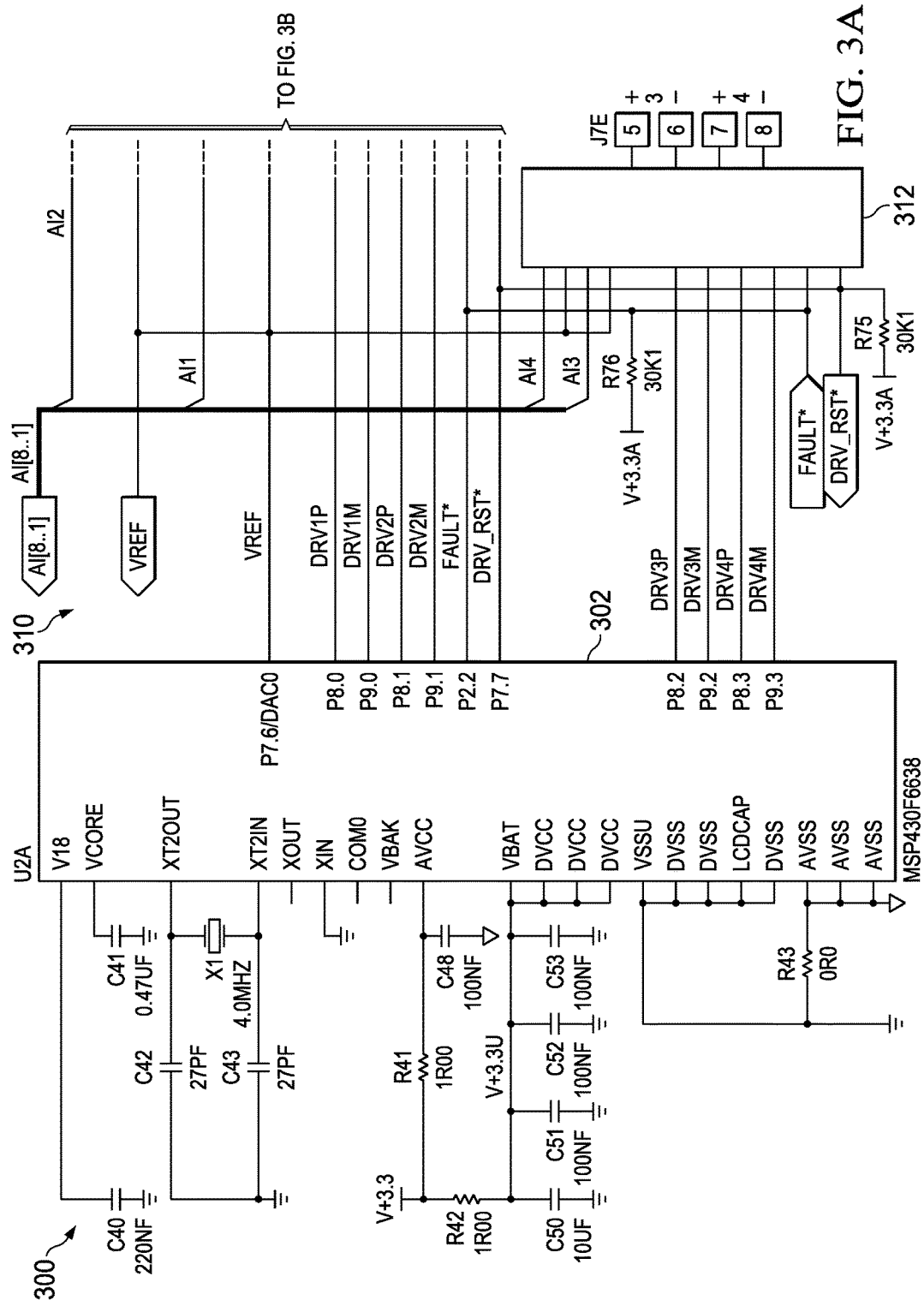
FIG. 3A and FIG. 3B illustrate one embodiment of a circuit diagram showing the configuration of a plurality of valve control outputs of the valve control board of FIG. 2.
Figure 3B:
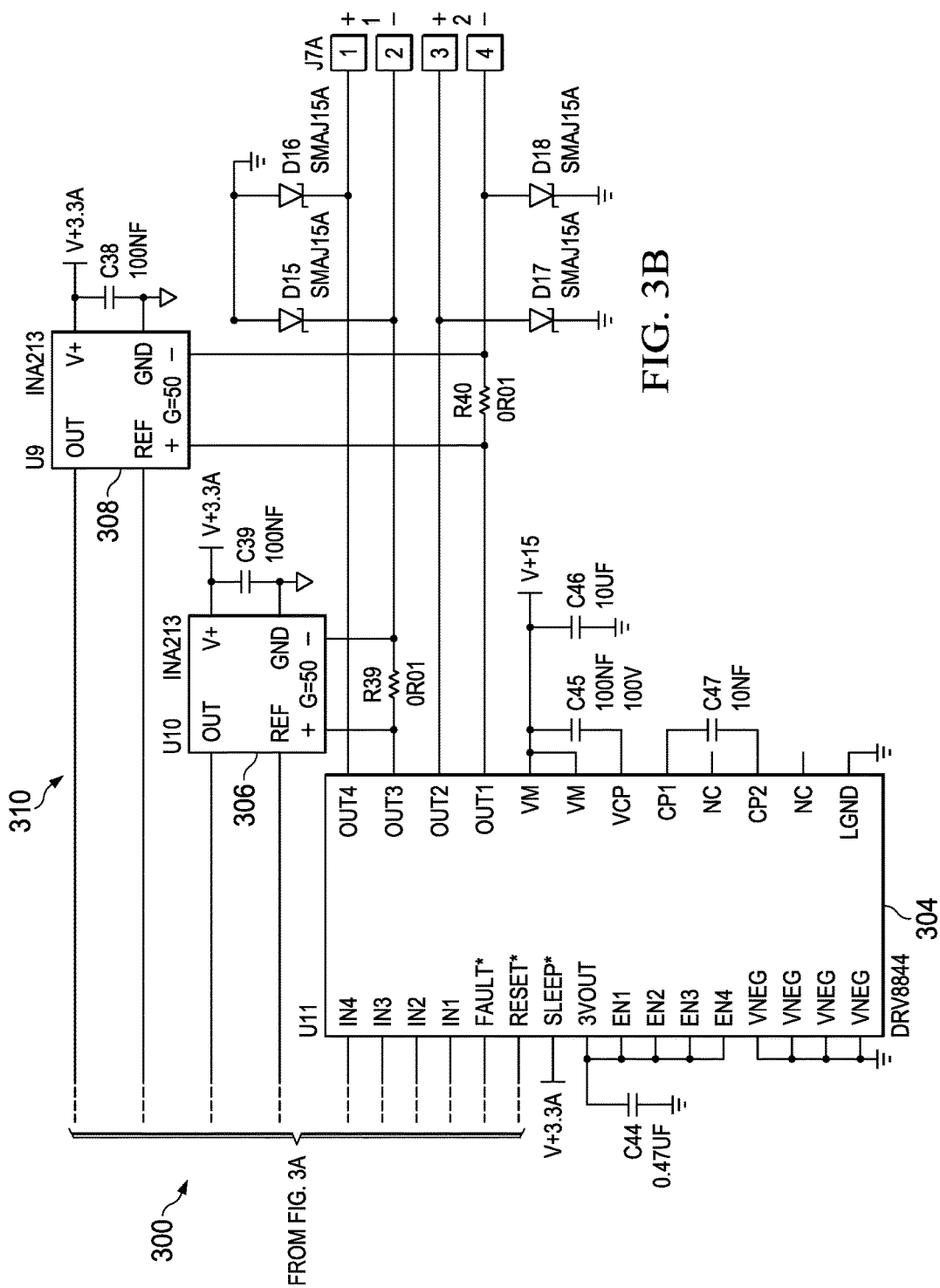

Referring now to FIGS. 3A and 3B, there is illustrated one embodiment of a circuit diagram 300, showing the configuration of the plurality of valve control outputs 202 of the board 200. There is illustrated a processor 302, such as a MSP430F6638 mixed signal microcontroller made by Texas Instruments (U2A). The microprocessor 302 has a V18 pin connected to a capacitor C40 having a capacitance of 220 nanofarads, with C40 connected to ground, a VCORE pin connected to a capacitor C41 having a capacitance of 0.47 microfarads, with C41 connected to ground, an XT2OUT pin connected to a 4 MHz crystal X1 and to a capacitor C42 having a capacitance of 27 picofarads, with C42 connected to ground, and an XT2IN pin also connected to the crystal X1 and connected to a capacitor C43 having a capacitance of 27 picofarads, with C43 being connected to ground. The microprocessor 302 also has an XOUT pin, an XIN pin connected to ground, a COM0 pin, and a VBAK pin. The microprocessor 302 includes an AVCC pin connected to a capacitor C48 having a capacitance of 100 nanofarads and also connected to a resistor R41 having a resistance of 1Ω connected to a supply of 3.3V. The capacitor C48 is connected to a low noise ground. The microprocessor 302 is further powered via a VBAT pin and three DVCC pins on the microprocessor 302 all connected on the same wire to a series of capacitors connected to ground. Specifically, there is one capacitor C50 having a capacitance of 10 microfarads connected to ground, and three capacitors (C51, C52, and C53) each having a capacitance of 100 nanofarads and each connected to ground. The capacitors C50-C53 are also connected to a resistor R42 having a resistance of 1Ω, the resistor R42 being connected between the 3.3V supply and between the resistor R41. The microprocessor 302 also includes a VS SU pin, three DVSS pins, and a LCDCAP pin all connected to ground and to a resistor R43 of 0Ω. The microprocessor 302 also has three AVSS pins connected to low noise ground, the AVSS pins also connected to the resistor R43, which links the AVSS pins and the VSSU, DVSS, and LCDCAP pins.

As described above, the board 200 is configured to actuate solenoid valves in order to control the irrigation of different zones in an agricultural environment. To control the solenoids, a solenoid driver 304 (U11) is included, such as a quad half-H bridge driver produced by Texas Instruments (DRV8844), as shown in the diagram 300. There is shown a DRV2M wire connected between a P9.1 pin of the microprocessor 302 and an IN1 pin of the solenoid driver 304. A DRV2P wire connects a P8.1 pin of the microprocessor 302 to an IN2 pin of the solenoid driver 304. A DRV1M wire connects a P9.0 pin of the microprocessor 302 to an IN3 pin of the solenoid driver 304. A DRV1P wire connects a P8.0 pin of the microprocessor 302 to an IN4 pin of the solenoid driver 304. A FAULT* wire connects a P2.2 pin of the microprocessor 302 to FAULT* pin of the solenoid driver 304. The FAULT* wire also connects to a resistor R76 of 30.1 kΩ, which R76 is connected to a V+3.3 A supply, which is a 3.3V current provided after a linear regulator drops a 15V current back down to 3.3V, as described herein with respect to FIGS. 5A and 5B. This allows for a fault to be detected after the voltage is dropped down to 3.3V. A DRV RST* wire connects a P7.7 pin of the microprocessor 302 to a RESET* pin of the solenoid driver 304. The DRV RST* wire also connects to a resistor R75 of 30.1 kΩ, which R75 is connected to the V+3.3 A supply.

The solenoid driver 304 also includes a SLEEP* pin connected to the V+3.3 A supply. The solenoid driver 304 further includes a 3VOUT pin, and 4 EN pins (EN1, EN2, EN3, and EN4) all connected on the same wire to a capacitor C44 having a capacitance of 0.47 microfarads, with C44 being connected to ground. The solenoid driver 304 also includes four VNEG pins all connected to ground. The solenoid driver 304 also has two VM pins connected to a voltage supply of 15V and to a capacitor C46 of 10 microfarads, C46 being connected to ground. The two VM pins also are connected to a capacitor C45 of 100 nanofarads which connects to a VCP pin of the solenoid driver 304. The solenoid driver 304 also includes a CP1 pin and a CP2 pin having a capacitor C47 of 10 nanofarads connected between. The solenoid driver 304 further includes two NC pins and a LGND pin, the LGND pin being connected to ground.

The solenoid driver 304 also includes four output pins (OUT1, OUT2, OUT3, and OUT4) used to output a current through output terminals on an output header (J7A) such as a Phoenix header, part no. 1803484. The output header has four output terminals to control two solenoids, wherein one terminal is used for a positive polarity current and one terminal is used for a negative polarity current for a single solenoid. In this way, the two solenoids attached to the output header each have a positive and negative wire, each wire connected to the corresponding terminal of the output header. As shown in diagram 300, output terminal 1 of J7A is a positive (+) terminal, output terminal 2 is a negative (−) terminal, output terminal 3 is a positive terminal (+), and output terminal 4 is a negative (−) terminal. Output terminals 1 and 2 are shown as corresponding to a first solenoid and output terminals 3 and 4 are shown as corresponding to a second solenoid. Output terminal 1 is connected to the OUT4 pin of the solenoid driver 304, with the wire connecting output terminal 1 and the OUT4 pin also being connected to a diode D16 (such as part no. SMAJ15A produced by Diodes, Inc.), D16 being connected to ground. A diode D15 also connects to the same wire and to ground, and D15 further connects to the wire connected to output terminal 2.

Output terminal 2 connects to OUT3 of the solenoid driver 304, with a current shunt monitor 306 (such as part no. INA213 produced by Texas Instruments) (U10) being connected between the output terminal 2 and the OUT3 pin having a gain of 50 (G=50). The current shunt monitor 306 has a positive (+) pin connected to the wire connecting output terminal 2 to OUT3 and a negative (−) pin also connected to the wire connecting output terminal 2 to OUT3. A resistor R39 of 0.01Ω is disposed between the two points where the positive and negative pins of the current shunt monitor 306 connect to the wire connecting output terminal 2 to OUT3. The current shunt monitor 306 also includes a V+ pin connected to the V+3.3 A supply and also connected to a capacitor C39 of 100 nanofarads, C39 also being connected to low noise ground and to a GND pin of the current shunt monitor 306, the GND pin also connected to low noise ground. The current shunt monitor 306 also has an OUT pin connected via a AI1 wire to analog input (AI[8 . . . 1]) and a REF pin connected via a VREF wire to a P7.6/DAC0 pin of the microprocessor 302. The current shunt monitor 306 allows for the current passing to the solenoid via the output terminal 2 to be monitored. After a current passes through the solenoid, the current will return through the output terminal of the opposite polarity to that which the current was originally sent. For example, if current is sent through the OUT4 pin of the solenoid driver 304 and through positive output terminal 1 to the solenoid (to open the solenoid valve), the current will naturally return through output terminal 2, across the wire to OUT3, allowing the current shunt monitor 304 to measure the current. Thus, only one current shunt monitor is required for each connected solenoid, as current sent through the negative output terminal can be measured as the current is sent, and current sent through the positive output terminal can be measured as the current returns through the negative output terminal.

Output terminal 3 is connected to the OUT2 pin of the solenoid driver 304, with the wire connecting output terminal 3 and the OUT2 pin also being connected to a diode D17, D17 being connected to ground. Output terminal 4 connects to OUT1 of the solenoid driver 304, with the wire connecting output terminal 4 and the OUT1 pin also being connected to a diode D18, D18 being connected to ground. A current shunt monitor 308 (U9) is connected between the output terminal 4 and the OUT1 pin having a gain of 50 (G=50). The current shunt monitor 308 has a positive (+) pin connected to the wire connecting output terminal 4 to OUT1 and a negative (−) pin also connected to the wire connecting output terminal 4 to OUT1. A resistor R40 of 0.01Ω is disposed between the two points where the positive and negative pins of the current shunt monitor 308 connect to the wire connecting output terminal 4 to OUT1.

The current shunt monitor 308 also includes a V+ pin connected to the V+3.3 A supply and also connected to a capacitor C38 of 100 nanofarads, C38 also being connected to low noise ground and to a GND pin of the current shunt monitor 308, the GND pin also connected to low noise ground. The current shunt monitor 308 also has an OUT pin connected via a AI2 wire to analog input (AI[8 . . . 1]) and a REF pin connected to the VREF wire connected to the P7.6/DAC0 pin of the microprocessor 302. The current shunt monitor 308 allows for current passing through output terminal 3 and 4 to be measure in the same way that the current shunt monitor 306 measures the current passing through output terminals 1 and 2. Thus, the configuration of the solenoid driver 304 and the current shunt monitors 306 and 308 and their connections make up a solenoid driver configuration 310.

In other embodiments, the current shunt monitors 306 and 308 may instead be connected the wires entering the IN1 and IN3 pins of the solenoid driver 304. Current entering the IN pins flows through to the OUT pins. Therefore, the current shunt monitors 306 and 308 could be on the IN1 and IN3 wires instead of the OUT1 and OUT3 wires, and would still be able to read the current. The placement of the current shunt monitors 306 and 308 is not limited to a specific location on the board 200. The current shunt monitors 306 and 308 may be positioned at other locations on the board while still enabling the current shunt monitors 306 and 308 to measure the current provided to the irrigation valves.

Another output header (J7E) is provided for connecting a third and fourth solenoid, with the output header having an output terminal 5 (+) and an output terminal 6(−) for controlling the third solenoid (3), and having an output terminal 7 (+) and an output terminal 8 (−) for controlling the fourth solenoid (4). A solenoid driver configuration 312 is provided that is configured in the same way as the solenoid driver configuration 310. AI4 and AI3 wires connect to OUT pins, and the VREF wire connected to REF pins, of the current shunt monitors of the solenoid driver configuration 312 (not shown). Additionally, a FAULT* pin and a RESET* pin of a solenoid driver of the solenoid driver configuration 312 (not shown) are connected to the FAULT* wire and the DRV RST* wire, respectively. IN4, IN3, IN2, and IN1 pins of the solenoid driver of the solenoid driver configuration 312 (not shown) are connected to the microprocessor 302 via pin P8.2 (DRV3P wire), pin P9.2 (DRV3M wire), pin P8.3 (DRV4P wire) and pin P9.3 (DRV4M wire), respectively.

Figure 4A:
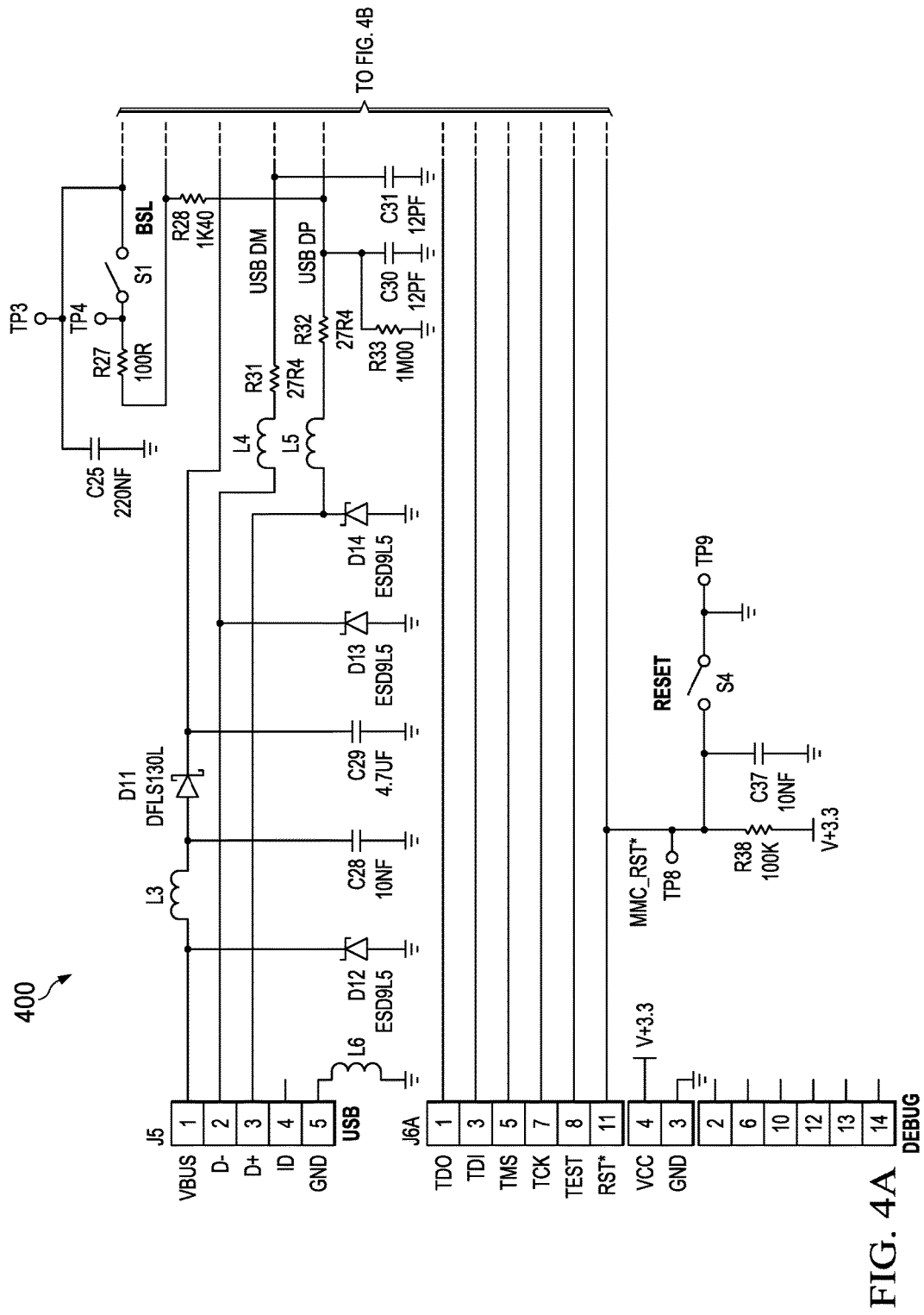
FIG. 4A and FIG. 4B illustrate one embodiment of a circuit diagram showing the configuration of communication components of the valve control board of FIG. 2.
Figure 4B:
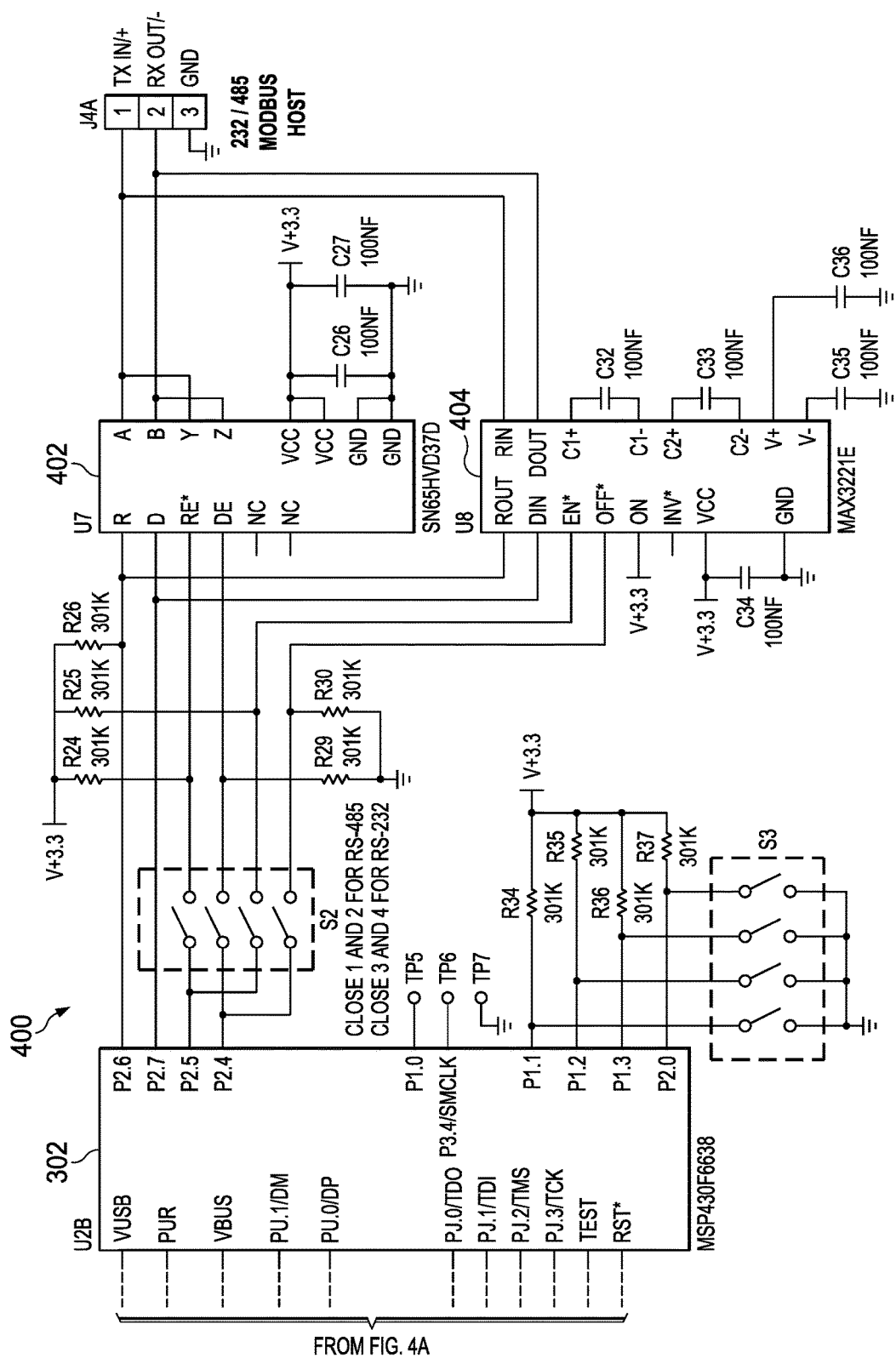

Referring now to FIGS. 4A and 4B, there is illustrated one embodiment of a circuit diagram 400, showing the configuration of communication components of the board 200. There is shown the microprocessor 302 (MSP430F6638) (U2B). The microprocessor 302 has a VUSB pin that connects to a pushbutton switch (S1) associated with the bootstrap loader (BSL) of the microprocessor 302. The switch S1 has on the side opposite the microprocessor 302 a test point (TP4) connected to a resistor R27 of 100Ω which connects to a resistor R28 of 1.4 kΩ, which R28 is connected to a PUR pin of the microprocessor 302. The wire connected to the VUSB pin is also connected to another test point TP3 and to a capacitor of 220 nanofarads, which is then connected to ground. The microprocessor 302 also includes a VBUS pin connected to a capacitor C29 of 4.7 microfarads and connected to ground, a diode D11 (such as a schottky diode, 1A, part no. DFLS130L-7, produced by Diodes, Inc.), another capacitor C28 of 10 nanofarads and connected to ground, an inductor L3, another diode D12 (such as a VRWM 3.3V TVS diode, part no. ESD9L5.0ST5G, produced by On Semiconductor) and connected to ground, and to a VBUS terminal (1) on a vertical USB mini-B connector (J5). The microprocessor 302 includes a PU.1/DM pin connected to a capacitor C31 of 12 picofarads and connected to ground, a resistor R31 of 27.4Ω over a USB DM wire further connected to an inductor L4, a diode D13 similar to diode D12 and connected to ground, and to a D− terminal (2) on J5. The microprocessor 302 also includes a PU.0/DP pin connected over a USB DP wire back to the resistor R28, and to a capacitor C30 of 12 picofarads and connected to ground, a resistor R33 of 1 mΩ and connected to ground, a resistor R32 of 27.4Ω, an inductor L5, a diode D14 similar to diodes D12 and D13 and connected to ground, and to a D+(3) terminal on J5. J5 also includes an ID (4) terminal and a GND (5) terminal connected to an inductor L6 and to ground.

The diagram 400 also shows an RS-232/485 interface. The microcontroller 302 has a P2.6 pin connected to a resistor R26 of 301 kΩ, which is connected to a 3.3V supply. The P2.6 pin is also connected to an R pin of a RS-485 transceiver 402 (U7) (such as part no. SN65HVD37D made by TI) and to a ROUT pin of a RS-232 transceiver 404 (U8) (such as part no. MAX3221E made by Maxim Integrated). The microprocessor 302 has a P2.7 pin connected to a D pin of the RS-485 transceiver 402 and to a DIN pin of the RS-232 transceiver 404. The microprocessor 302 has a P2.5 pin connected to switches 1 and 3 (S2), wherein when switch 1 is closed, P2.5 is interfaced with a RE* pin of the RS-485 transceiver 402, and connected to a resistor R24 of 301 kΩ connected to the 3.3V supply, and when switch 3 is closed P2.5 is interfaced with an EN* pin of the RS-232 transceiver 404, and connected to a resistor R25 of 301 kΩ and connected to the 3.3V supply. The microprocessor 302 also includes a P2.4 pin connected to switches 2 and 4 (S2), wherein when switch 2 is closed, P2.4 is interfaced with a DE pin of the RS-485 transceiver 402 and to a resistor R29 of 301 kΩ connected to ground, and when switch 4 is closed, P2.4 is interfaced with a OFF* pin of the RS-232 transceiver 404 and to a resistor R30 of 301 kΩ connected to ground. Thus, when switches 1 and 2 are closed, RS-485 communications are enabled, and when switches 3 and 4 are closed, RS-232 communications are enabled.

The RS-485 transceiver 402 further includes two NC pins, an A pin, and a Y pin, wherein the A pin and the Y pin are connected to a TX IN/+ terminal (1) of a three-position vertical header (J4A), such as that made by Phoenix, part no. 1803439. A RIN pin of the RS-232 transceiver 404 is also connected to the TX IN/+ terminal. The RS-485 transceiver 402 also has a B pin and a Z pin connected to a RX OUT/− terminal (2) of the header (J4A), whereas a DOUT pin of the RS-232 transceiver 404 is also connected to the RX OUT/− terminal (2). The header (J4A) also has a GND terminal (3) connected to ground. The RS-485 transceiver additionally has a two VCC pins connected to a 3.3V supply, and two GND pins connected to ground, with a capacitor C26 of 100 nanofarads and a capacitor C27 of 100 nanofarads connected between the wire connecting the VCC pins to the 3.3V supply and the wire connecting the GND pins to ground.

The RS-232 transceiver 404 includes an ON pin connected to the 3.3V supply, an INV* pin, a VCC pin connected to the 3.3V supply, and a GND pin connected to ground, with a capacitor C34 of 100 nanofarads connected between the VCC and the GND pin wires. The RS-232 transceiver 404 also includes a C1+ pin connected to a capacitor C32 of 100 nanofarads and a C1− pin also connected to C32. There is also shown a C2+ pin connected to a capacitor C33 of 100 nanofarads and a C2− pin also connected to C33. The RS-232 transceiver 404 also includes a V+ pin connected to a capacitor C36 of 100 nanofarads and connected to ground, and a V− pin connected to C35 of 100 nanofarads connected to ground.

The microprocessor 302 also includes a P1.0 pin connected to a test point (TP5) and a P3.4/SMCLK pin connected to a test point (TP6). A test point (TP7) is also shown connected to ground. The microprocessor 302 also has a PJ.0/TDO pin connected to a TDO terminal (1) of a header J6A (such as part no. D2514-6VOC-AR-WD made by 3M Electronic Solutions). The header J6A is intended to be used for debugging and firmware development, and is not intended to be stuffed by end users of the board 200. The microprocessor 302 also has a PJ.1/TDI pin connected to a TDI terminal (3) of the header J6A, a PJ.2/TMS pin connected to a TMS terminal (5) of the header J6A, a PJ.3/TCK pin connected to a TCK terminal (7) of the header J6A, a TEST pin connected to a TEST terminal (8) of the header J6A, and a RST* pin connected to a RST* terminal (11) of the header J6A. The wire connected to the RST* pin also has connected thereto a reset configuration (MMC_RST*), including a test point (TP8) connected to a resistor R38 of 100 kΩ, R38 connected to the 3.3V supply, a capacitor C37 of 10 nanofarads connected to ground, and a pushbutton switch (S4), having a test point (TP9) disposed opposite the switch S4 and connected to ground. The header J6A additionally includes a VCC terminal (4) connected to the 3.3V supply, a GND terminal (9) connected to ground, and additional terminals (2, 4, 10, 12, 13, and 14).

Referring now to FIG. 4C, and still to FIGS. 4A and 4B, the board 200 further includes addressability of devices connected to the board 200, as described with respect to FIG. 2. The microprocessor 302 has a P1.1 pin connected to a resistor R34 of 301 kΩ and connected to the 3.3V supply, a P1.2 pin connected to a resistor R35 of 301 kΩ and connected to the 3.3V supply, a P1.3 pin connected to a resistor R36 of 301 kΩ and connected to the 3.3V supply, a P2.0 pin connected to a resistor R37 of 301 kΩ and connected to the 3.3V supply. A four-position switch (S3) is also provided having four switches (s1, s2, s3, and s4). Switch s1 is connected to pin P1.1, switch s2 is connected to pin P1.2, switch s3 is connected to pin P1.3, and switch s4 is connected to pin P2.0. As shown in FIGS. 4A and 4B, different combinations of open and closed switches of the four switches results in different, in this embodiment, Modbus addresses ranging from addresses 1-16. Other communication protocols may be used however.

The + and − output pulse durations for each output are stored, in some embodiments, in Modbus holding registers. The values may be reported as single-precision floating point values (32-bits). The value for pulse durations may be an integer between 15 and 400. Pulse durations default to 80 milliseconds. The host can read and write the register values. If the host writes a value less than 15 or greater than 400 milliseconds, the existing value is not changed. Fractional values are ignored.

Regarding output detection status, a status bit in a Valve n Assumed State register associated with the valve is set to 1 if a valid pulse is detected on the + terminal or reset to 0 if a valid pulse is detected on the − terminal. The status bits default to a value of 0 on power-up. The status bit does not change if a fault was detected during the pulse. These values do not necessarily represent the actual state of the valve. After power-up or reset of the board 200, all values indicate open (0) regardless of the actual valve state.

There may be implemented various addressing schemes used during operation of the board 200 and the solenoid valves. For example, when the board 200 is connected to eight different solenoid valves, there may be an address used for turning on or off each one (eight different addresses total). There may also be a separate address for resetting input counters, one for resetting faults, and one for restoring factory default settings. There may also be, when using eight solenoid valves, eight different assumed state addresses. The assumed state addresses hold what should be the current state of the valve to which the address is associated (ON/OFF). In some embodiments this may be a Boolean (TRUE/FALSE) value. There may also be a separate address for a power supply fault status. Input counter values for each input may also be stored each in a separate address. Each valve may also have a fault value and a pulse duration value, each stored in a separate address. The addresses may function under any type of protocol, such as Modbus, PakBus, or others.

Figure 5A:
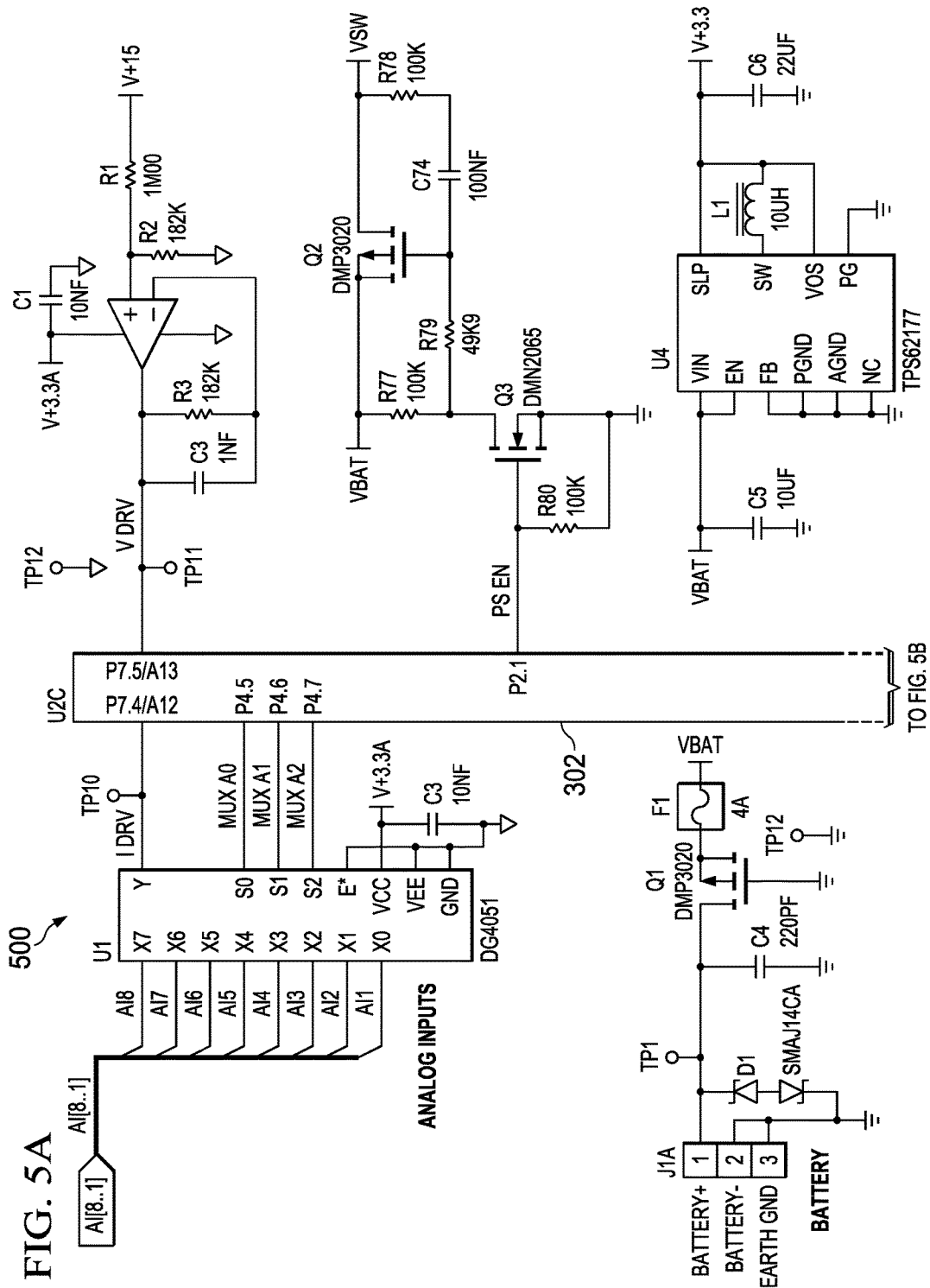
FIG. 5A and FIG. 5B illustrate one embodiment of a circuit diagram including inputs and voltage switching circuitry of the valve control board of FIG. 2.
Figure 5B:
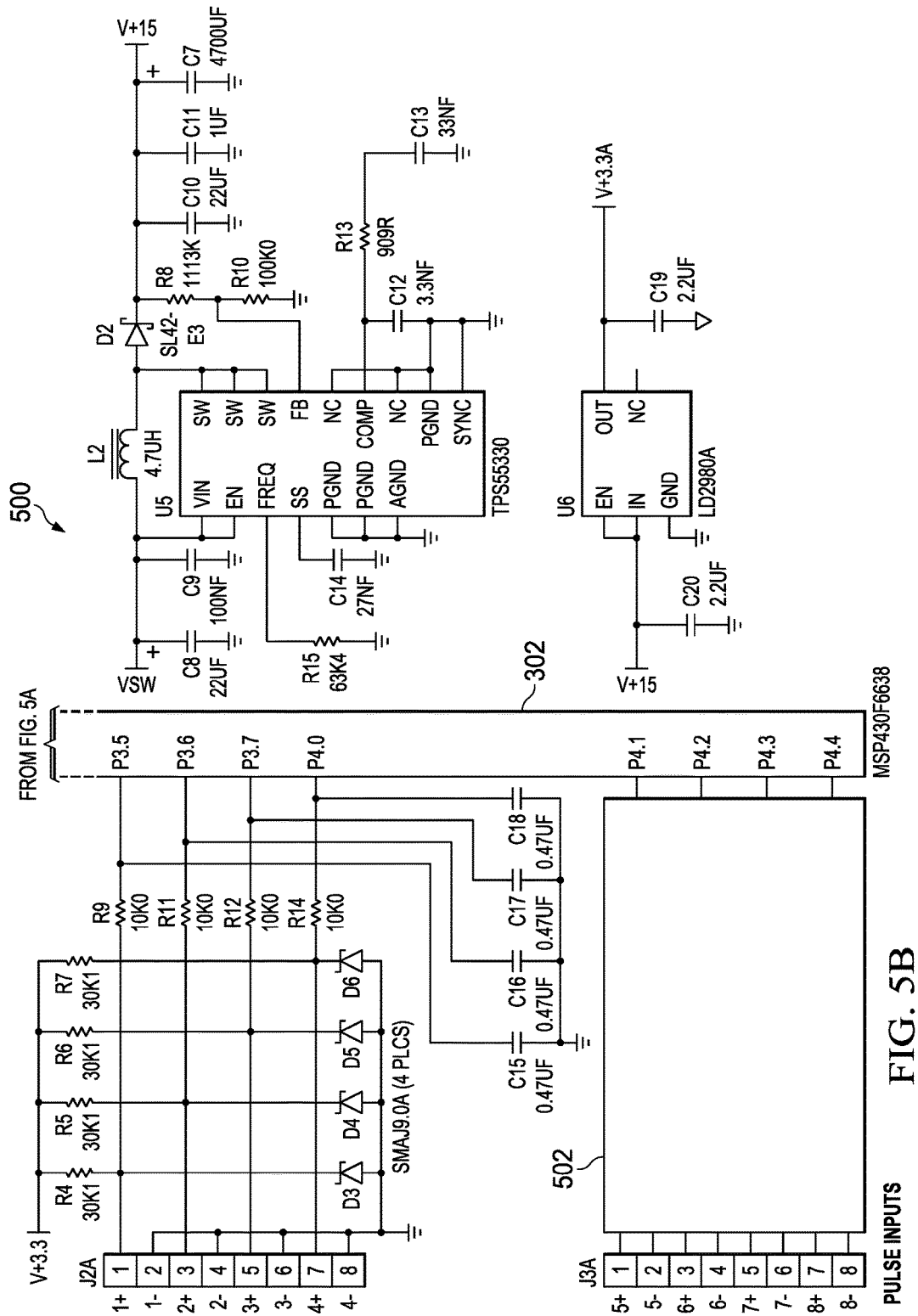

Referring now to FIGS. 5A and 5B, there is illustrated one embodiment of a circuit diagram 500 including inputs and voltage switching circuitry of the board 200. There is shown again the microprocessor 302 (U2C) having a P7.4/A12 pin connected to a test point (TP10) over an I DRV wire to a Y pin of an 8:1 mux (U1) such as that made by Vishay, part no. DG4051AEQ-T1-E3. The mux U1 further includes pins X0, X1, X2, X3, X4, X5, X6, and X7 corresponding to analog inputs AI1, AI2, AI3, AI4, AI5, AI6, AI7, and AI8, respectively. The mux U1 has am S0 pin connected over a MUX A0 wire, an S1 pin connected over a MUX A1 wire, and an S2 pin connected over a MUX A2 wire to pins P4.5, P4.6, and P4.7 of the microcontroller 302, respectively. The mux U1 also has an E* pin, a VEE pin, and a GND pin connected to low noise ground, the low noise ground also having connected thereto a capacitor C3 of 10 nanofarads. A VCC pin is also connected to the capacitor C3 as well as to the V+3.3 A.

The circuit diagram 500 also includes a test point (TP12) connected to low noise ground. A pin P7.5/A13 of the microprocessor 302 is connected to another test point (TP11) along a V DRV wire, which also has connected thereto a capacitor C2 of 1 nanofarad, a resistor R3 of 182 kΩ, and a zero-drift amplifier U3, such as that made by Texas Instruments (part no. OPA330AIDCKT. The amplifier U3 has a negative (−) terminal connected to the resistor R3 and the capacitor C2, and a positive (+) terminal connected to a resistor R2 of 182 kΩ, the resistor R2 also connected to low noise ground, and a resistor R1 of 1 mΩ connected to V+15. The amplifier U3 also is connected to low noise ground, to V+3.3 A, and to a capacitor C1 of 10 nanofarads connected to low noise ground.

Diagram 500 also shows a header J1A for connecting the battery to the board 200. The header J1A has a battery+ terminal, a battery− terminal, and an earth GND terminal. The battery− terminal and the earth GND terminal are both connected to ground. The battery+ terminal has a wire with a diode D1 (such as an SMAJ14CA diode made by Diodes, Inc.) connected thereto and to ground. The wire connected to the battery+ terminal also has connected thereto a capacitor C4 of 220 picofarads and connected to ground, a MOSFET Q1 such as a DMP3020LSS made by Diodes, Inc., connected to ground and further connected to a fuseholder F1 for holding a 4 A fuse, which is connected to VBAT.

Diagram 500 also illustrates a pin P2.1 of the microprocessor 302 connected via a PS EN wire to a resistor R80 of 100 kΩ, R80 being connected to ground, and to a MOSFET Q3 such as a DMN2065 made by Diodes, Inc., the MOSFET Q3 also being connected to ground. The MOSFET Q3 also is connected a resistor R77 of 100 kΩ, which is connected to VBAT and to a MOSFET Q2 such as a DMP3020 made by Diodes, Inc, MOSFET Q2 being connected to VSW. Disposed on a wire connected between the wire connecting Q2 to VSW and the wire connecting Q3 to R77, there is a resistor R78 of 100Ω connected to the wire connecting Q2 to VSW. The resistor R78 is connected to a capacitor C74 of 100 nanofarads, which is connected to a resistor R79 of 49.9 kΩ, which is connected to the wire connecting Q3 to R77. The MOSFET Q2 is also connected to the wire between the capacitor C74 and the resistor R79.

Diagram 500 also illustrates how the VBAT power is pulled down to V+3.3. VBAT is connected via a wire to a step-down DC-DC converter U4 (such as a TPS62177DQCR made by Texas Instruments) at a VIN pin. Connected to this wire connecting VBAT to the DC-DC converter U4 is a capacitor C5 of 10 microfarads. The DC-DC converter U4 has an EN pin also connected to this wire at a junction. The DC-DC converter U4 further has an FB pin, a PGND pin, a AGND pin, an NC pin, and a PG pin all connected to ground. An SLP pin of the DC-DC converter U4 has connected thereto a wire to provide the V+3.3 power. This wire connected to the SLP pin also has connected thereto an inductor L1 having 10 microhenries, which is connected to an SW pin of the DC-DC converter U4. A VOS pin of the DC-DC converter U4 is also connected to the wire connected to the SLP pin. The wire connected to the SLP pin also has connected thereto a capacitor C6 of 22 microfarads, connected to ground.

Diagram 500 further shows a configuration allowing for the voltage to be ramped up to V+15, in order to activate or deactivate a latching solenoid valve. There is shown VSW connected to an inductor L2 of 4.7 microhenries via a wire also having connected thereto a capacitor C8 of 22 microfarads and a capacitor C9 of 100 nanofarads, the wire also having connected thereto wires that are connected to a VIN pin and a EN pin of a step-down DC-DC converter U5, such as a TPS55330RTET made by Texas Instruments. The DC-DC converter U5 further has a FREQ pin connected to a resistor R15 of 63.4 kΩ, which is connected to ground, a SS pin connected to a capacitor C14 of 27 nanofarads, which is connected to ground, and two PGND pins and an AGND pin all connected to ground. The DC-DC converter U5 also has two NC pins connected to a wire that is connected to a PGND pin, with this wire forming a junction with another wire that connected to ground and to a capacitor C12 of 3.3 nanofarads. A SYNC pin of the DC-DC converter U5 is also connected to the wire that is connected to ground and C12. The capacitor C12 is further connected to a wire that is connected to a COMP pin of the DC-DC converter U5 and to a resistor R13 of 909Ω, which is connected to a capacitor C13 of 33 nanofarads, which is in turn connected to ground.

A wire connected the inductor L2 with a diode D2, such as a SL42-E3 diode made by Diodes, Inc, the wire also connected, at a junction between inductor L2 and diode D2, to three SW pins of the DC-DC converter U5. The diode D2 is further connected along this wire to a resistor R8 of 113 kΩ, which is connected via a junction to a FB pin of the DC-DC converter U5 and to a resistor R10 of 10 kΩ, which is connected to ground. The wire connected to diode D2 is further connected to a capacitor C10 of 22 microfarads, which is connected to ground, a capacitor C11 of 1 microfarads, which is connected to ground, and a capacitor C7 of 4700 microfarads, which is also connected to ground. The capacitor C7 server to increase the 3.3V voltage to around 15 volts to provide the V+15 voltage necessary to actuate (turn on or off) a latching solenoid valve. This voltage is only necessary for a short period of time in order to latch the solenoid valve. Once latched, the extra power provided is not needed, as latching solenoid vales do not need a constant current.

Figure 5C:
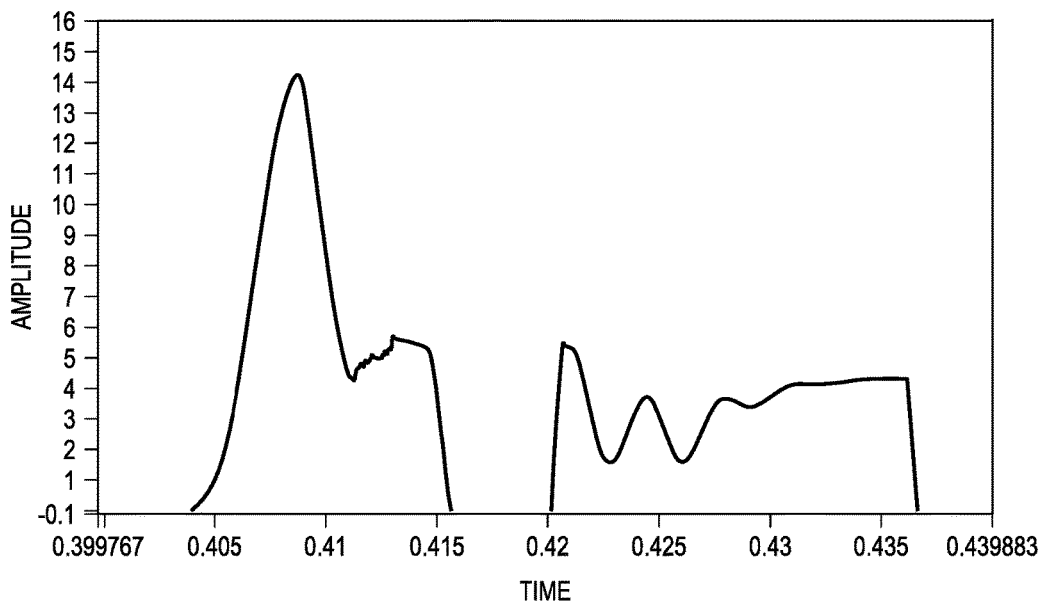
FIG. 5C illustrates one embodiment of a BAT input current profile when actuating a solenoid valve.

The board 200 boosts the battery voltage to 15V in order to guarantee adequate solenoid voltage under all operating conditions. When a valve on/off command is received, the board 200 connects power to a 4700 uF output capacitor and turns on a DC-DC converter to step up the output voltage to 15V. BAT input current spikes as high as 15 A momentarily as the output capacitor charges. The voltage boosting circuit used to boost the voltage allows current to flow from the battery to the boost capacitor (C7) even when it is disabled. FIG. 5C illustrates one embodiment of a BAT input current profile when actuating a solenoid valve, with amplitude in amps and time in seconds.

Figure 5D:
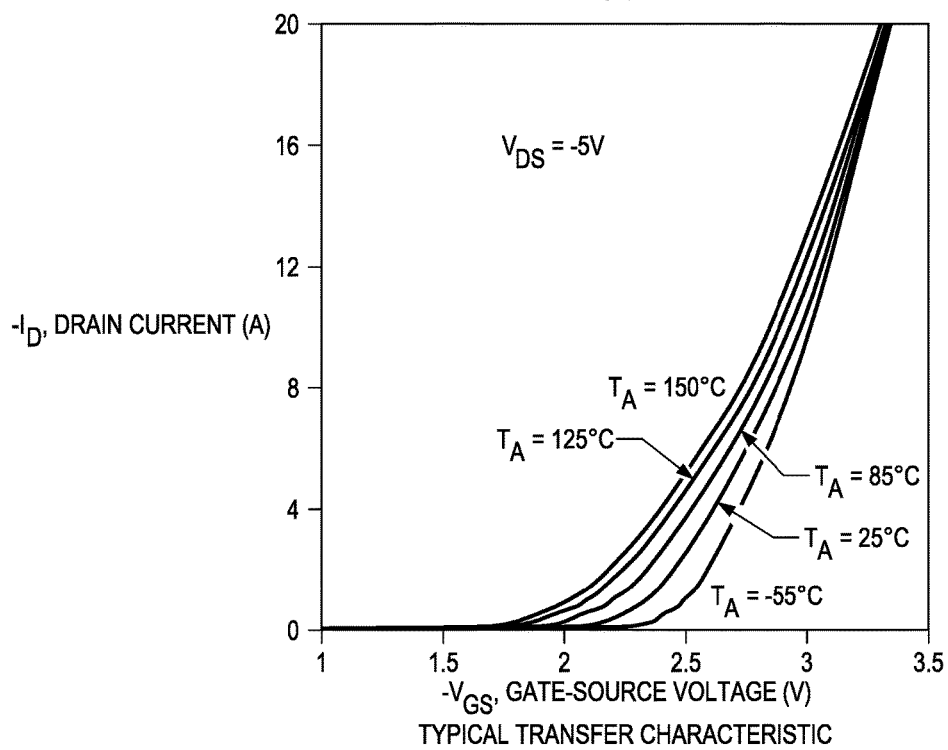
FIG. 5D illustrates one embodiment of a graph of a typical transfer characteristic of a gate-source voltage.

In order to meet the quiescent power goal of 1 mA, battery power to the boost capacitor (and thence to the output control circuits) must be interrupted when power is not being delivered to the solenoids. Use of a FET switch to interrupt power would result in an inrush current spike of almost 40 A when solenoid power is switched on using a fresh high quality battery and short wires. This is excessive, and thus the power mitigation circuit, connected to the P2.1 pin of the microprocessor 302, described herein, is used for mitigation. The critical components of this switching circuit, C74 and R78, are included so that power reaches the operating threshold within 15 mS and the inrush spike is limited to less than 14 A. The exact delay will vary from board to board and over the operating temperature, but, as shown in FIG. 5D, the gate-source threshold voltage of the FET increases as a function of increasing drain current, tending to compensate for any tendency for the circuit to turn on too quickly.

There is further shown in diagram 500 a linear regulator U6, such as LD2980ABM33TR made by STM. The V+15 voltage is provided along a wire, which has connected thereto a capacitor C20 of 2.2 microfarads, and is connected to EN and IN pins of the linear regulator U6. The linear regulator U6 also includes a GND pin connected to ground, an NC pin, and an OUT pin. The OUT pin is connected to a capacitor C19 of 2.2 microfarads, which is connected to low noise ground. The linear regulator U6 serves to bring the V+15 voltage back down to V+3.3 A once the V+15 voltage is no longer needed after a solenoid valve has been actuated.

Diagram 500 also illustrates input headers J2A and J3A. Input headers J2A and J3A each have 8 terminals, four positive and four negative terminals. J2A provides input terminals for inputs 1-4 (1+, 1−, 2+, 2−, 3+, 3−, 4+, 4−) and J3A provides input terminals for inputs 5-8 (5+, 5−, 6+, 6−, 7+, 7−, 8+, 8−). The 1+, 2+, 3+, and 4+ terminals are connected to pins P3.5, P3.6, P3.7, and P4.0 of the microprocessor 302, respectively, with resistors R9, R11, R12, and R14 each of 10 kΩ, and capacitors C15, C16, C17, and C18 each of 0.47 microfarads, and each connected to ground, disposed between the 1+, 2+, 3+, and 4+ terminals and the pins. The 1−, 2−, 3−, and 4− terminals connect to the same wire which is connected to ground, as well as to diodes D3, D4, D5, and D6 (such as SMAJ9.0A made by Diodes, Inc.), which also connect to ground. Diode D3 is connected via a wire, which also forms a junction with the wire connecting the 1+ terminal to pin P3.5, to a resistor R4 of 30.1 kΩ Diode D4 is connected via a wire, which also forms a junction with the wire connecting the 2+ terminal to pin P3.6, to a resistor R5 of 30.1 kΩ Diode D5 is connected via a wire, which also forms a junction with the wire connecting the 3+ terminal to pin P3.7, to a resistor R6 of 30.1 kΩ Diode D6 is connected via a wire, which also forms a junction with the wire connecting the 4+ terminal to pin P4.0, to a resistor R7 of 30.1 kΩ Resistors R4, R5, R6, and R7 are all connected to V+3.3. An input configuration 502, which connects the header J3A to pins P4.1, P4.2, P4.3, and P4.4 of the microprocessor 302, is assembled in the same way as the configuration connecting the header J2A.

Figure 6A:
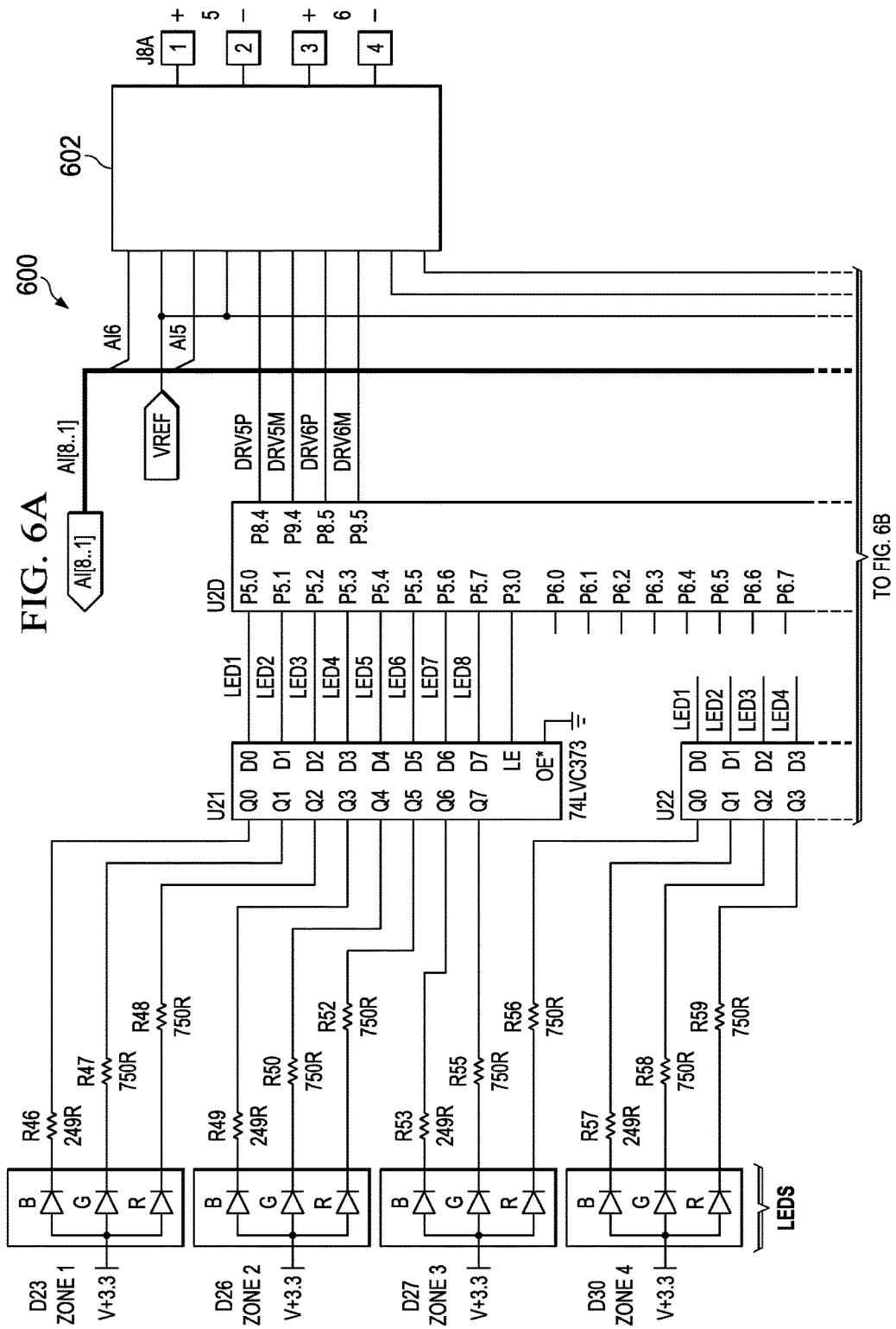
FIG. 6A and FIG. 6B illustrate one embodiment of a circuit diagram including LED indicators and additional solenoid driver configurations of the valve control board of FIG. 2.
Figure 6B:
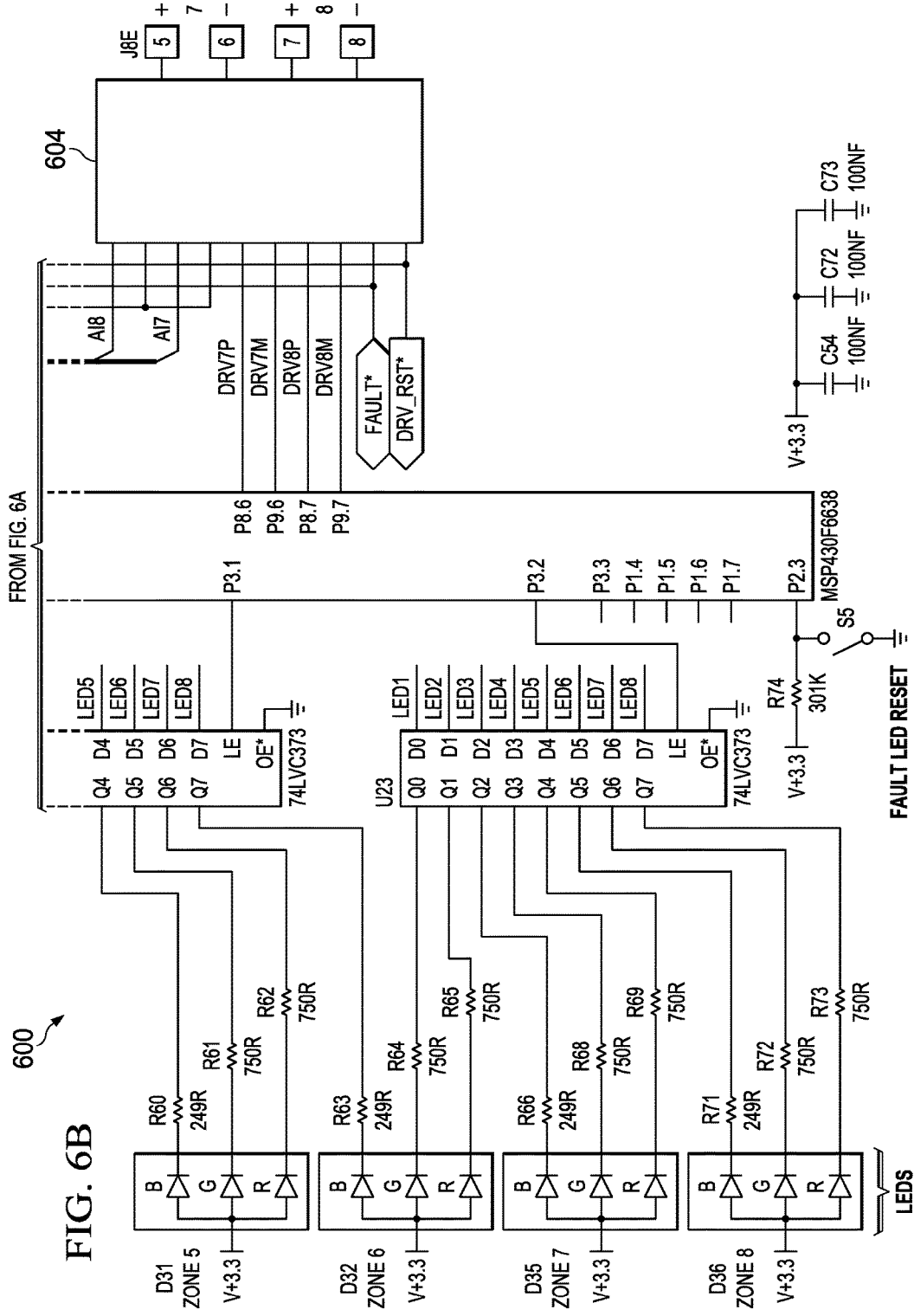

Referring now to FIGS. 6A and 6B, there is illustrated one embodiment of a circuit diagram 600 including LED indicators and additional solenoid driver configurations. The microprocessor 302 (U2D) is again shown. The microprocessor 302 has pins P5.0, P5.1, P5.2, P5.3, P5.4, P5.5, P5.6, and P5.7 connected over wires LED1, LED2, LED3, LED4, LED5, LED6, LED7, and LED 8, respectively, and connected to pins D0, D1, D2, D3, D4, D5, D6, and D7, respectively, of an octal transparent latch (U21) such as that produced by NXP, part no. 74LVC373. Latch U21 also includes an LE pin connected to a P3.0 pin of the microprocessor 302. Latch U21 includes an OE* pin connected to ground. Latch U21 also includes pins Q0, Q1, Q2, Q3, Q4, Q5, Q6, and Q7, for connecting the latch U21 to RGB LED diodes. There are eight sets of RGD LED diodes provided (D23, D26, D27, D30, D31, D32, D35, and D36) that correspond to eight irrigation zones, with each also being connected to the 3.3V supply.

Q0 of U21 is connected across a resistor R46 of 249Ω to a blue diode of D23. Q1 of U21 is connected across a resistor R47 of 750Ω to a green diode of D23. Q2 of U21 is connected across a resistor R48 of 750Ω to a red diode of D23. Q3 of U21 is connected across a resistor R49 of 249Ω to a blue diode of D26. Q4 of U21 is connected across a resistor R50 of 750Ω to a green diode of D26. Q5 of U21 is connected across a resistor R52 of 750Ω to a red diode of D26. Q6 of U21 is connected across a resistor R53 of 249Ω to a blue diode of D27. Q7 of U21 is connected across a resistor R55 of 750Ω to a green diode of D27.

Additional octal transparent latches U22 and U23 are also provided. The LE pin of latch U22 is connected to pin 23.1 of the microprocessor 302, and the LE pin of latch U23 is connected to the P3.2 latch of the microprocessor 302. The D0-D7 pins of latches U22 and U23 are not connected to the microprocessor 302, unlike latch U21. Instead latches U22 and U23 are each connected to a RGB LED diode that a previous latch is connected. Specifically, latch U22 is connected to the red diode of D27, with the blue and green diodes of D27 being connected to latch U21. Similarly, latch U23 is connected to the green diode of D32, whereas the blue diode of D32 is connected to latch U22. This allows for all LEDs to function without needing to connect as many wires to the microcontroller 302.

Q0 of U22 is connected across a resistor R56 of 750Ω to the red diode of D27. Q1 of U22 is connected across a resistor R57 of 249Ω to a blue diode of D30. Q2 of U22 is connected across a resistor R58 of 750Ω to a green diode of D30. Q3 of U22 is connected across a resistor R59 of 249Ω to a red diode of D30. Q4 of U22 is connected across a resistor R60 of 249Ω to a blue diode of D31. Q5 of U22 is connected across a resistor R61 of 750Ω to a green diode of D31. Q6 of U22 is connected across a resistor R62 of 750Ω to a red diode of D31. Q7 of U22 is connected across a resistor R63 of 249Ω to a blue diode of D32.

Q0 of U23 is connected across a resistor R64 of 750Ω to a green diode of D32. Q1 of U23 is connected across a resistor R65 of 750Ω to a red diode of D32. Q2 of U23 is connected across a resistor R66 of 249Ω to a blue diode of D35. Q3 of U23 is connected across a resistor R68 of 750Ω to a green diode of D35. Q4 of U23 is connected across a resistor R69 of 750Ω to a red diode of D35. Q5 of U23 is connected across a resistor R71 of 249Ω to a blue diode of D36. Q6 of U23 is connected across a resistor R72 of 750Ω to a green diode of D36. Q7 of U23 is connected across a resistor R73 of 750Ω to a red diode of D36.

The latches U21, U22, and U23 are also associated with capacitors C54, C72, and C73, each having a capacitance of 100 nanofarads, and each being connected to the 3.3V supply. The microprocessor 302 further includes pins P6.0, P6.1, P6.2, P6.3, P6.4, P6.5, P6.6, P6.7, P3.3, P1.4, P1.5, P1.6, and P1.7. A fault LED reset configuration that triggers as defined herein is also provided, having a pushbutton switch S5 connected to ground, connected to a P2.3 pin of the microprocessor 302, and connected to the 3.3 V supply over a resistor R74 of 301 kΩ.

Another output header (J8A) is provided for connecting a fifth and sixth solenoid, with the output header having an output terminal 1 (+) and an output terminal 2 (−) for controlling the fifth solenoid (5), and having an output terminal 3 (+) and an output terminal 4 (−) for controlling the sixth solenoid (6). A solenoid driver configuration 602 is provided that is configured in the same way as the solenoid driver configurations 310 and 312. AI6 and AI5 wires connect to OUT pins, and the VREF wire connected to REF pins, of the current shunt monitors of the solenoid driver configuration 602 (not shown). Additionally, a FAULT* pin and a RESET* pin of a solenoid driver of the solenoid driver configuration 602 (not shown) are connected to the FAULT* wire and the DRV RST* wire, respectively. IN4, IN3, IN2, and IN1 pins of the solenoid driver of the solenoid driver configuration 602 (not shown) are connected to the microprocessor 302 via pin P8.4 (DRVSP wire), pin P9.4 (DRVSM wire), pin P8.5 (DRV6P wire) and pin P9.5 (DRV6M wire), respectively.

Another output header (J8E) is provided for connecting a seventh and eighth solenoid, with the output header having an output terminal 5 (+) and an output terminal 6 (−) for controlling the seventh solenoid (7), and having an output terminal 7 (+) and an output terminal 8 (−) for controlling the eighth solenoid (8). A solenoid driver configuration 604 is provided that is configured in the same way as the solenoid driver configurations 310, 312, and 602. AI8 and AI7 wires connect to OUT pins, and the VREF wire connected to REF pins, of the current shunt monitors of the solenoid driver configuration 604 (not shown). Additionally, a FAULT* pin and a RESET* pin of a solenoid driver of the solenoid driver configuration 604 (not shown) are connected to the FAULT* wire and the DRV RST* wire, respectively. IN4, IN3, IN2, and IN1 pins of the solenoid driver of the solenoid driver configuration 604 (not shown) are connected to the microprocessor 302 via pin P8.6 (DRV7P wire), pin P9.6 (DRV7M wire), pin P8.7 (DRV8P wire) and pin P9.7 (DRV8M wire), respectively.

Figure 7A:
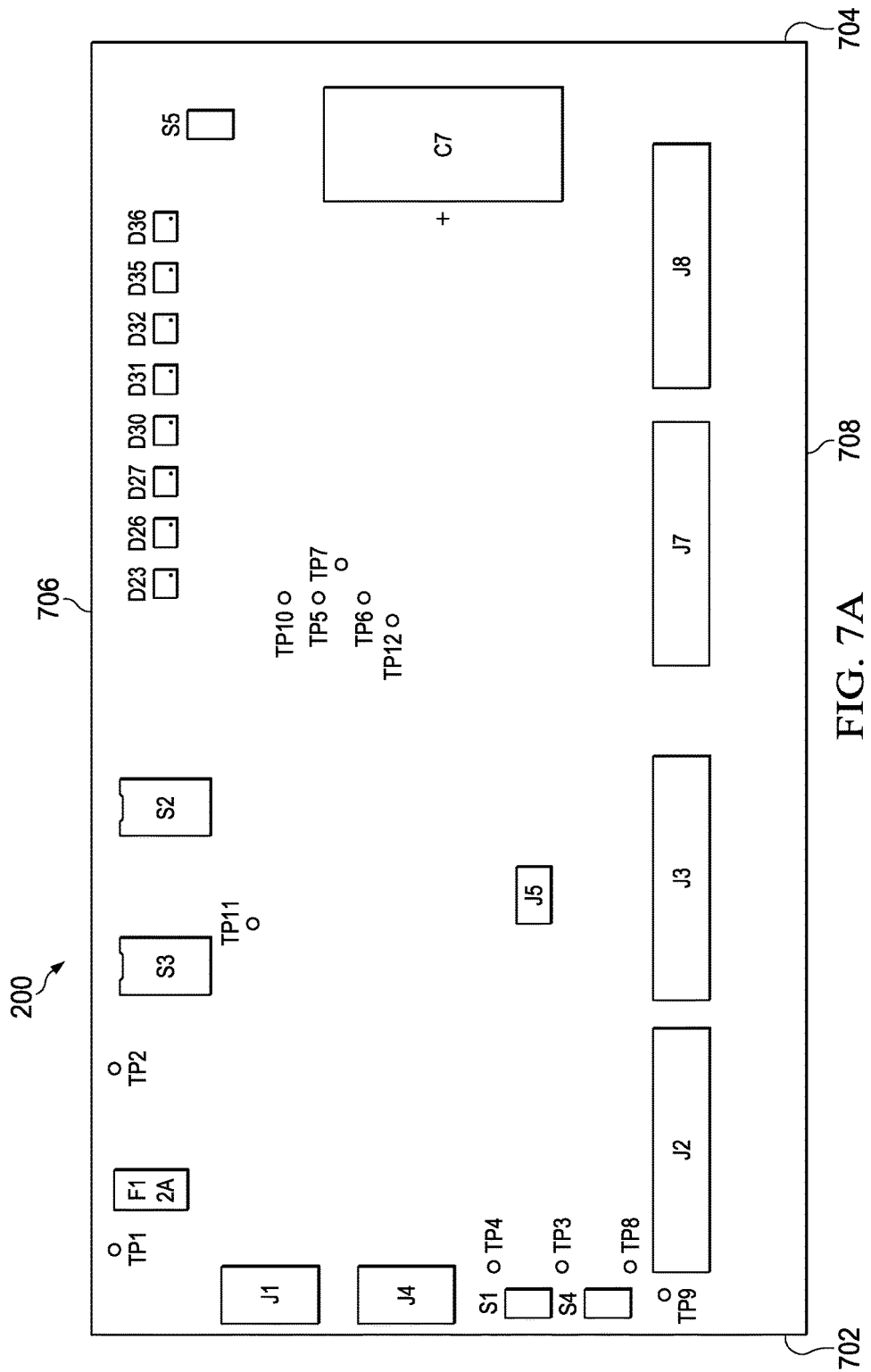
FIG. 7A illustrates one embodiment of a top side of the valve control board of FIG. 2.

Referring now to FIG. 7A, there is illustrated one embodiment of a top side of the board 200. The board 200 in some embodiments is a two-sided board having a top side and a bottom side, and a left edge 702, a right edge 704, a top edge 706, and a bottom edge 708. The top side of the board includes near the top edge 706, and moving across the board 200 from the left edge 702 to the right edge 704, a test point TP1, a fuseholder F, a test point TP2, communications protocol switches S3 and S4, a plurality of diodes D23, D26, D27, D30, D31, D32, D35, and D36 (RGB LED diodes), and a fault switch S5. Near the center of the right edge 704 is the capacitor C7 having 4700 microfarads. Along the left edge 702 of the board, moving from the top edge 706 to the bottom edge 708, is the battery connection header J1, the communications header J4, the BSL switch S1, and the reset switch S4. Test points TP4, TP3, TP8, and TP9 are situated near the switches S1 and S4.

Along the bottom edge 708, moving from the left edge 702 to the right edge 704, are the inputs headers J2 and J3 and the output headers J7 and J8. Near the center of the top side of the board 200 are test points TP5, TP6, TP7, TP10, and TP12, as well as a USB connector J5.

Figure 7B:
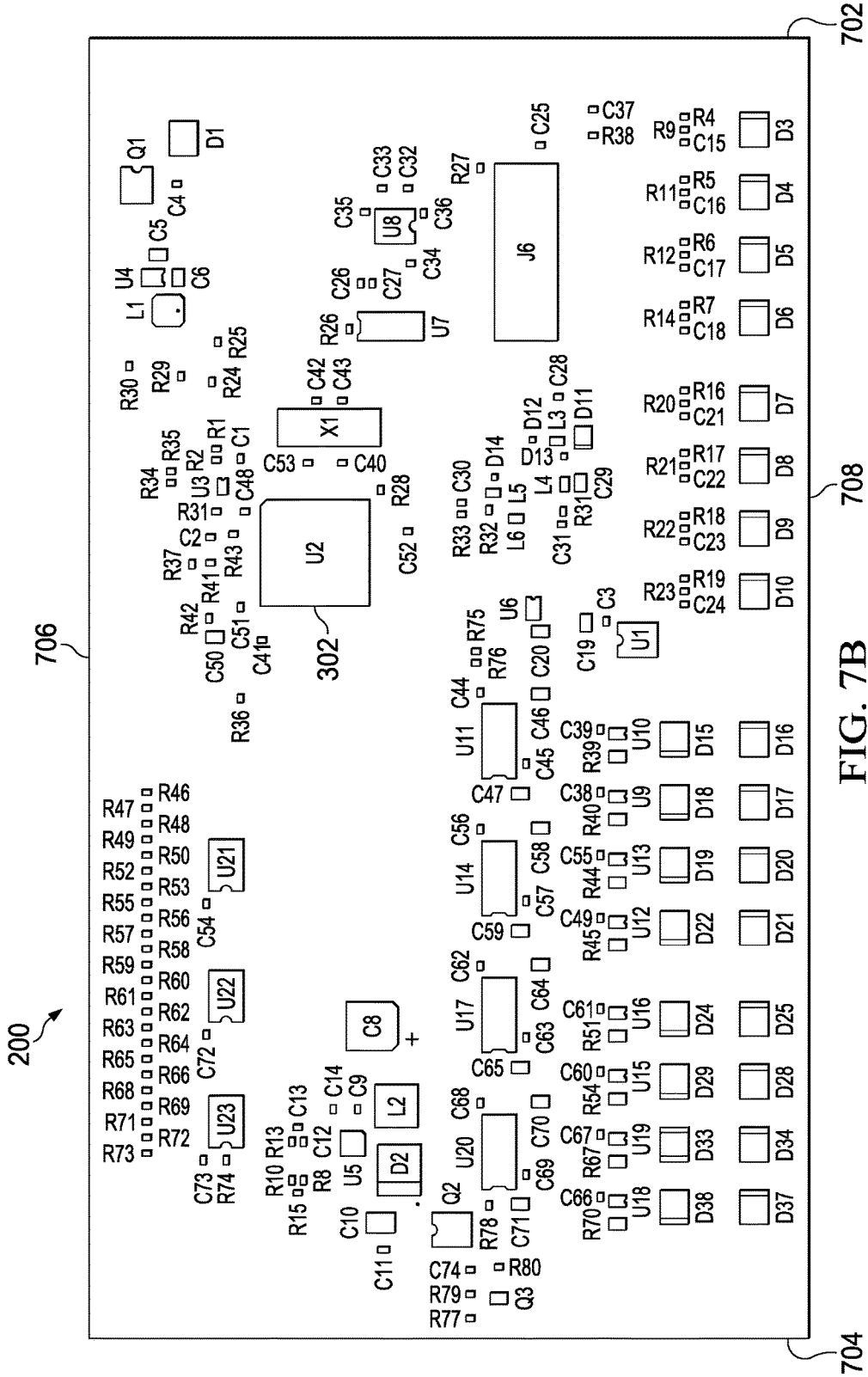
FIG. 7B illustrates one embodiment of a bottom side of the valve control board of FIG. 2.

Referring now to FIG. 7B, there is illustrated one embodiment of the bottom side of the board 200. There is again shown the left edge 702, the right edge 704, the top edge 706, and the bottom edge 708. The bottom side of the board 200 has near the right edge 704, and near the top edge 706, resistors R46, R47, R48, R49, R50, R52, R53, R55, R56, R57, R58, R59, R60, R61, R62, R63, R64, R65, R66, R68, R69, R71, R72, R73 situated opposite the diodes D23, D26, D27, D30, D31, D32, D35, and D36 on the top side of the board 200. Below these resistors, and moving down the right edge 704, are capacitors C54, C72, and C73, resistor R74, and octal transparent latches U21, U22, and U23. Further down the board 200 near the right edge 704 are resistors R10, R13, R15, and R8, capacitors C8, C9, C10, C11, C12, C13, and C14, all situated near the DC-DC converter U5, diode D2, and inductor L2. Still further down the board 200 are resistors R77 and R79, capacitor C74, MOSFET Q2, and resistor R78. Still further down the board 200 is MOSFET Q3 near resistors R78, R80, as well as capacitors C44, C45, C46, C47, C56, C57, C58, C59, C62, C63, C64, C65, C68, C69, C70, and C71, and resistors R75 and R76, all situated near solenoid drivers U11, U14, U17, and U20.

Still further down the board 200 are capacitors C66, C67, C60, C61, C49, C55, C38, and C39, and resistors R70, R67, R54, R51, R45, R44, R40, R39, situated near the shunt monitors U18, U19, U15, U16, U12, U13, U9, and U10. Below the shunt monitors, and situated opposite the headers J7 and J8 on the top side of the board 200, are diodes D38, D33, D29, D24, D22, D19, D18, and D15. Below these diodes near the bottom edge 708 are diodes D37, D34, D28, D25, D21, D20, D17, and D16.

Near the top center of the bottom side of the board 200 is microprocessor 302 (U2), with resistors R1, R2, R3, R28, R34, R35, R36, R37, R41, R42, and R43, capacitors C1, C2, C40, C41, C48, C50, C51, C52, and C53, and amp U3 situated nearby. There is also situated near the microprocessor 302 (U2) the crystal X1 and capacitors C42 and C43. There is also shown near the top edge 706 and left edge 702 resistors R24, R25, R29, and R30, inductor L1, DC-DC converter U4, capacitors C4, C5, and C6, MOSFET Q1, and diode D1. Further down the board 200 near the left edge 702 are the RS-485 transceiver U7 and the RS-232 transceiver U8, near resistor R26 and capacitors C26, C27, C32, C33, C34, C35, and C36. Still further down the board 200 are header J6, as well as resistor R27 and capacitor C25 situated opposite the switch S1. There is also shown capacitors C19, C20, C28, C29, C30, and C31, resistors R31, R32, and R33, linear regulator U6, inductors L3, L4, L5, and L6, and diodes D11, D12, D13, and D14, all situated above MUX U1 and a series of additional resistors and capacitors.

This series of additional resistors and capacitors are situated to the right of MUX U1, moving towards the left edge 702, and above a series of diodes disposed opposite the headers J2 and J3 on the top side of the board 200. Capacitor C15 and resistors R4 and R9 are disposed above diode D3, capacitor C16 and resistors R5 and R11 are disposed above diode D4, capacitor C17 and resistors R6 and R12 are disposed above diode D5, and capacitor C18, R7, and R14 are disposed above diode D6. Additionally, capacitor C21 and resistors R16 and R20 are disposed above diode D7, capacitor C22 and resistors R17 and R21 are disposed above diode D8, capacitor C23 and resistors R18 and R22 are disposed above diode D9, and capacitor C24 and resistors R19 and R23 are disposed above diode D10. Resistor R38 and capacitor C37 are also shown near the left edge 702, opposite the switch S4 on the top side of the board 200.

A full list of the components of the board is given in Table 1.

TABLE 1

| DESCRIPTION | REF DES | MFR | MFRPN | VALUE |
| --- | --- | --- | --- | --- |
| CAPACITOR, 0402, 10 NF, 25 V | C1, C3, C28, C37 | MURATA | GRM155R71E103KA01D | 10 NF |
| CAPACITOR, 1210 PKG | C10 | MURATA | GRM32ER61E226KE15L | 22 UF |
| CAPACITOR, MLCC, 0603 | C11 | MURATA | GRM188R61E105KA12D | 1 UF |
| CAPACITOR, MLCC, 0402 | C12 | MURATA | GRM155R71H332KA01D | 3.3 NF |
| CAPACITOR, MLCC, 0402 | C13 | MURATA | GRM155R71A333KA01D | 33 NF |
| CAPACITOR, MLCC, 0402 | C14 | MURATA | GRM155R61A273KA01D | 27 NF |
| CAPACITOR, MLCC, 0402 | C15, C16, C17, C18, C21, C22, C23, C24, C41, C44, C56, C62, C68 | TAIYO | JMK105BJ474KV-F | 0.47 UF |
| CAPACITOR, MLCC, 0805 PKG | C19, C20 | KEMET | C0603C225K8RACTU | 2.2 UF |
| CAPACITOR, MLCC, 0402 | C2 | MURATA | GRM155R71H102KA01D | 1 NF |
| CAPACITOR, MLCC, 0402 | C25, C40 | TAIYO YUDEN | EMK105B7224KV-FR | 220 NF |
| CAPACITOR, CERAMIC CHIP, 4.7 UF, 16 V, 0805 | C29 | TAIYO YUDEN | TMK212AB7475KG-T | 4.7 UF |
| CAPACITOR, MLCC, 0402 | C30, C31 | MURATA | GRM1555C1H120GA01D | 12 PF |
| CAPACITOR, 0402, 220 PF, 100 V | C4 | MURATA | GCM155R72A221KA37D | 220 PF |
| CAPACITOR, MLCC, 0402 | C42, C43 | MURATA | GRM1555C1H270JA01D | 27 PF |
| CAPACITOR, MLCC, 0805 PKG | C47, C59, C65, C71 | VISHAY | VJ0805Y103KXBMC | 10 NF |
| CAPACITOR, MLCC, 0805 PKG | C5, C46, C50, C58, C64, C70 | MURATA | GRM219R61E106KA12D | 10 UF |
| CAPACITOR, MLCC, 0805 PKG | C6 | MURATA | GRM21BR60J226ME39L | 22 UF |
| CAPACITOR, ALUMINUM, RADIAL, 16 MM DIA × 7.5 MM LS | C7 | NICHICON | UVZ1E472MHD | 4700 UF |
| CAPACITOR, ALUMINUM ORGANIC POLYMER, 22 UF | C8 | PANASONIC | 35SVPF22M | 22 UF |
| CAPACITOR, MLCC, 0402 | C9, C26, C27, C32, C33, C34, C35, C36, C38, C39, C45, C48, C49, C51, C52, C53, C54, C55, C57, C60, C61, C63, C66, C67, C69, C72, C73, C74 | MURATA | GRM155R61E104KA87D | 100 NF |
| DIODE, TVS, BIDIRECTIONAL | D1 | DIODES INC | SMAJ14CA-13-F | SMAJ14CA |
| DIODE, SCHOTTKY, 1A | D11 | DIODES, INC | DFLS130L-7 | DFLS130L |
| DIODE, TVS, VRWM 3.3 V | D12, D13, D14 | ON SEMI | ESD9L5.0ST5G | ESD9L5 |
| DIODE, TVS, 13VRWM, 16.4 A IPP | D15, D16, D17, D18, D19, D20, D21, D22, D24, D25, D28, D29, | DIODES, INC | SMAJ15A | SMAJ15A |

TABLE 1-continued

| DESCRIPTION | REF DES | MFR | MFRPN | VALUE |
|---|---|---|---|---|
| | D33, D34, D37, D38 | | | |
| DIODE, SCHOTTKY | D2 | VISHAY | SL42-E3/57T | SL42-E3 |
| DIODE, LED, RGB | D23, D26, D27, D30, D31, D32, D35, D36 | CREE | CLV1A-FKB-CJ1M1F1BB7R4S3 | CLV1A-FKB |
| DIODE, TVS, 9.0VRWM, 26 A IPP | D3, D4, D5, D6, D7, D8, D9, D10 | DIODES, INC | SMAJ9.0A | SMAJ9.0A |
| SMT FUSEHOLDER WITH FUSE, 3 A | F1 | LITTELFUSE | 0154004.DR | 4 A |
| HEADER, 3-POS, 3.81 MM, VERTICAL | J1, J4 | PHOENIX | 1803439 | |
| HEADER, 8-POS, 3.81 MM, VERTICAL | J2, J3, J7, J8 | PHOENIX | 1803484 | |
| CONNECTOR, USB, RECEPTACLE, MINI-B, SMT, VERTICAL | J5 | TE CONNECTIVITY | 1734753-1 | USB |
| INDUCTOR, FERRITE CORE, 18 UH | L1 | COILCRAFT | LPS4018-103MRB | 10 UH |
| INDUCTOR, FERRITE CORE | L2 | COILCRAFT | XAL5030-472MEB | 4.7 UH |
| INDUCTOR, FERRITE CHIP, 1K OHM AT 1 MHZ | L3, L4, L5, L6 | BOURNS | MH1608-221Y | 1K OHM AT 1 MHZ |
| PLUG, 3-POS, 3.81 MM, VERTICAL SCREW AND WIRE | P1, P4 | PHOENIX | 1850673 | |
| PLUG, 8-POS, 3.81 MM, VERTICAL SCREW, HORIZONTAL WIRE | P2, P3, P7, P8 | PHOENIX | 1827033 | |
| MOSFET, P-CHANNEL, RDS_ON = .014, VDS = 30, VGS = 25, ID = 12 A | Q1, Q2 | DIODES, INC | DMP3020LSS | DMP3020 |
| MOSFET, N-CHANNEL, VDS = 20 V | Q3 | DIODES, INC | DMN2065UW-7 | DMN2065 |
| RESISTOR, THICK FILM CHIP | R1, R33 | KOA SPEER | RK73H1ETTP1004F | 1M00 |
| RESISTOR, THICK FILM CHIP | R13 | KOA SPEER | RK73H1ETTP9090F | 909R |
| RESISTOR, THICK FILM CHIP | R15 | KOA SPEER | RK73H1ETTP6342F | 63K4 |
| RESISTOR, THICK FILM CHIP | R2, R3 | KOA SPEER | RK73H1ETTP1823F | 182K |
| RESISTOR, THICK FILM CHIP | R24, R25, R26, R29, R30, R34, R35, R36, R37, R74 | KOA SPEER | RK73H1ETTP3013F | 301K |
| RESISTOR, THICK FILM CHIP | R27, R78 | KOA SPEER | RK73H1ETTP1000F | 100R |
| RESISTOR, THICK FILM CHIP | R28 | KOA SPEER | RK73H1ETTP1401F | 1K40 |
| RESISTOR, THICK FILM CHIP | R31, R32 | KOA SPEER | RK73H1ETTP27R4F | 27R4 |
| RESISTOR, THICK FILM CHIP | R38, R77, R80 | KOA SPEER | RK73H1ETTP1003F | 100K |
| RESISTOR, THICK FILM CHIP | R39, R40, R44, R45, R51, R54, R67, R70 | BOURNS | CRF0805-FX-R010ELF | 0R01 |
| RESISTOR, THICK FILM CHIP | R4, R5, R6, R7, R16, R17, R18, R19, R75, R76 | KOA SPEER | RK73H1ETTP3012F | 30K1 |
| RESISTOR, THICK FILM CHIP | R41, R42 | VISHAY DALE | CRCW04021R00FKED | 1R00 |
| RESISTOR, 0402, 0R0, 1%, 200 PPM | R43 | YAGEO | AC0402FR-070RL | 0R0 |
| RESISTOR, THICK FILM CHIP | R46, R49, R53, R57, R60, R63, R66, R71 | KOA SPEER | RK73H1ETTP2490F | 249R |
| RESISTOR, THICK FILM CHIP | R47, R48, R50, R52, R55, R56, R58, R59, R61, R62, R64, R65, R68, R69, R72, R73 | KOA SPEER | RK73H1ETTP7500F | 750R |
| RESISTOR, THICK FILM CHIP | R79 | KOA SPEER | RK73H1ETTP4992F | 49K9 |
| RESISTOR, THICK FILM CHIP | R8 | KOA SPEER | RK73H1ETTP1133F | 113K |
| RESISTOR, THICK FILM CHIP | R9, R10, R11, R12, R14, R20, R21, R22, R23 | KOA SPEER | RK73H1ETTP1002F | 10K0 |
| SWITCH, PUSHBUTTON | S1, S4, S5 | TE CONN | 147873-1 | RACON8 |
| SWITCH, DIP, 4-POS, SMT | S2, S3 | CTS | 219-4MST | |
| IC, 8:1 MUX | U1 | VISHAY | DG4051AEQ-T1-E3 | DG4051 |
| IC, QUAD HALF-H BRIDGE DRIVER | U11, U14, U17, U20 | TI | DRV8844PWPR | DRV8844 |
| IC, MICROCONTROLLER, MSP430, 256 FLASH, 16K RAM | U2 | TI | MSP430F6638IPZ | MSP430F6638 |
| IC, OCTAL TRANSPARENT LATCH | U21, U22, U23 | NXP | 74LVC373APW, 118 | 74LVC373 |
| IC, OP AMP, SINGLE, UPWR, PRECISION | U3 | TI | OPA330AIDCKT | OPA330 |
| IC, STEP-DOWN DC-DC CONVERTER | U4 | TI | TPS62177DQCR | TPS62177 |
| IC, STEP-DOWN DC-DC CONVERTER | U5 | TI | TPS55330RTET | TPS55330 |
| IC, LINEAR REGULATOR, 3.3 V OUT, 50 MA | U6 | STM | LD2980ABM33TR | LD2980A |

TABLE 1-continued

| DESCRIPTION | REF DES | MFR | MFRPN | VALUE |
|---|---|---|---|---|
| IC, SINGLE-CHANNEL RS-485 TRANSCEIVER | U7 | TI | SN65HVD37D | SN65HVD37D |
| IC, SINGLE-CHANNEL RS-232 TRANSCEIVER | U8 | MAXIM | MAX3221EIPWR | MAX3221E |
| IC, CURRENT SHUNT MONITOR, G = 50 | U9, U10, U12, U13, U15, U16, U18, U19 | TI | INA213BIDCKR | INA213 |
| CRYSTAL, 4 MHZ, SMT | X1 | ABRACON | ABLS3-4.000MHZ-D4Y-T | 4.0 MHZ |

Figure 8:
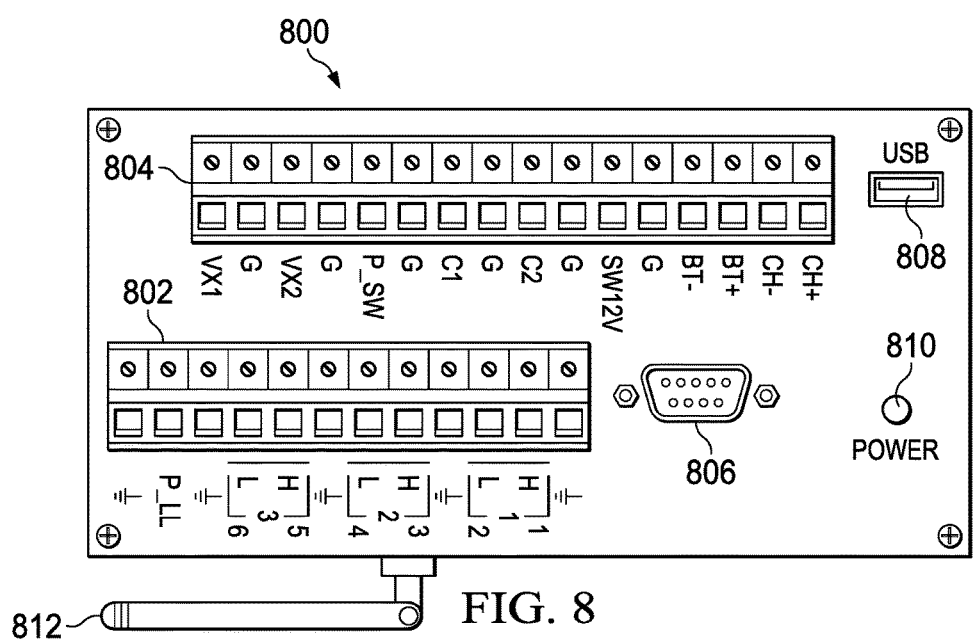
FIG. 8 illustrates one embodiment of a measurement and control telemetry board.

Referring now to FIG. 8, there is illustrated one embodiment of a measurement and control telemetry board 800. The board 800 is meant to be used in conjunction with the board 200, and to be in communication with board 200, so that data gathered from sensors interfaced with the board 800 may be communicated to the board 200 and to the host controller. The board 800 includes an input header 802 and an input header 804. The input header 802 has, from right to left, a ground terminal, a first analog input terminal (1/H), a second analog input terminal (2/L), a ground terminal, a third analog input terminal (3/H), a fourth analog input terminal (4/L), a ground terminal, a fifth analog input terminal (5/H), a sixth analog input terminal (6/L), a ground terminal, a P_LL terminal, and another ground terminal. The P_LL terminal is a pulse counting terminal for low level AC (20 kHz) and a high frequency counter (20 kHz). The analog input terminals server as either six single-ended or three differential inputs. These inputs may have −100 to +2500 mV and ±34 mV ranges 24 bit ADC. If using differential inputs, each of the three inputs is denoted by a number (1, 2, 3) with brackets around an H and L terminal, as shown in FIG. 8. In some embodiments, the first and second analog input terminals may be 4 to 20 mA or 0 to 20 mA inputs. In some embodiments, digital I/O functions may be allowed on certain inputs, such as on analog inputs terminals 1-4, and consist of 3.3 V logic to be used as a high frequency counter (35 kHz), pulse width modulation, interrupts and timer input, and period average (200 kHz, amplitude dependent).

The inputs header 804 includes, from left to right, a VX1 terminal, a ground terminal, a VX2 terminal, a ground terminal, a P_SW terminal, a ground terminal, a C1 terminal, a ground terminal, a C2 terminal, a ground terminal, a SW12V terminal, a ground terminal, a BT- terminal, a BT+ terminal, a CH- terminal, and a CH+ terminal. The VX1 and VX2 terminals are sensor excitation or continuous 0.15 to 5V terminals for sensor excitation or output control. The P_SW terminal is a pulse counting terminal used as a switch closure (150 Hz) and/or a high frequency counter (35 kHz). The C1 and C2 terminals control terminals that are software configurable for digital I/O functions that consist of 5V output and 3.3V input logic levels for use as SDI-12, a high frequency counter (3 kHz), a switch closure (150 Hz), a general status/control, a voltage source (5V: 10 mA @ 3.5V), interrupts, and/or a serial asynchronous communication Tx/Rx pair. The SW12V terminal is switched 12V terminal for powering sensors or communication devices (500 mA @ 20° C.). The BT+ and BT− terminals are a battery terminal pair for regulated 12V power input or rechargeable 12V VRLA for UPS mode. The CH+ and CH− terminals are a charge terminal pair for 16 to 32 V from a DC power converter or from a 16-24 V solar panel (10 W or 5 W).

In some embodiments, the board 800 further includes an RS-232 port 806 for connecting wireless/cellular modems or serial sensors. The board 800 may also include a USB port 808 (such as a micro B type USB port) for direct connection to a PC, which the PC may act as a limited power source during configuration. The board 800 may also include an LED power indicator 810. The board also includes an integrated radio option wherein an antenna can be attached to the board via a connector 812. This radio option allows for radio compatible (wireless) sensors to be used in connection with the board 800, instead of requiring that numerous wires be run from the board 800 out into the irrigation zones. The board 800 additionally allows for networking wireless to another node such as the board 200, or to an Internet gateway. This thus allows for a user to communicate and control the board 800 using a cellular or satellite peripheral. In some embodiments of the integrated radio, the input voltage may be 9 to 16 Vdc, the power output may be 5 to 250 mW and software selectable, the frequency range may be 902 to 928 MHz, hopping channels may provide 7 25-channel hop sequences sharing 64 available channels, RF data rates may be 200 kbps, and receive sensitivity may be −101 dBm. In other embodiments, the integrated radio may have an input voltage of 7 to 28 Vdc, power output may be 10 to 1,000 mW and software selectable, hopping channels may be 50 to 111 (user selectable) or 15 per band (105 total), RF data rates may be selectable speeds, such as 115.2 or 153.6 kbps, and receive sensitivity may be −108 dBm at 115.2 kbps for 10-4BER or −103 dBm at 153.6 kbps for 10-4 BER.

It will be understood that the board 800 may include additional hardware components needed for operation of the board 800. For example, the board may include a CPU, internal memory, and other hardware components. In some embodiments, the CPU may be an ARM Cortex M4 (144 MHz), and the internal memory may be 10 MB of flash memory for data storage, 5 MB flash for CPU drive/programs, and 2 MB of flash memory for an operating system.

Figure 9:
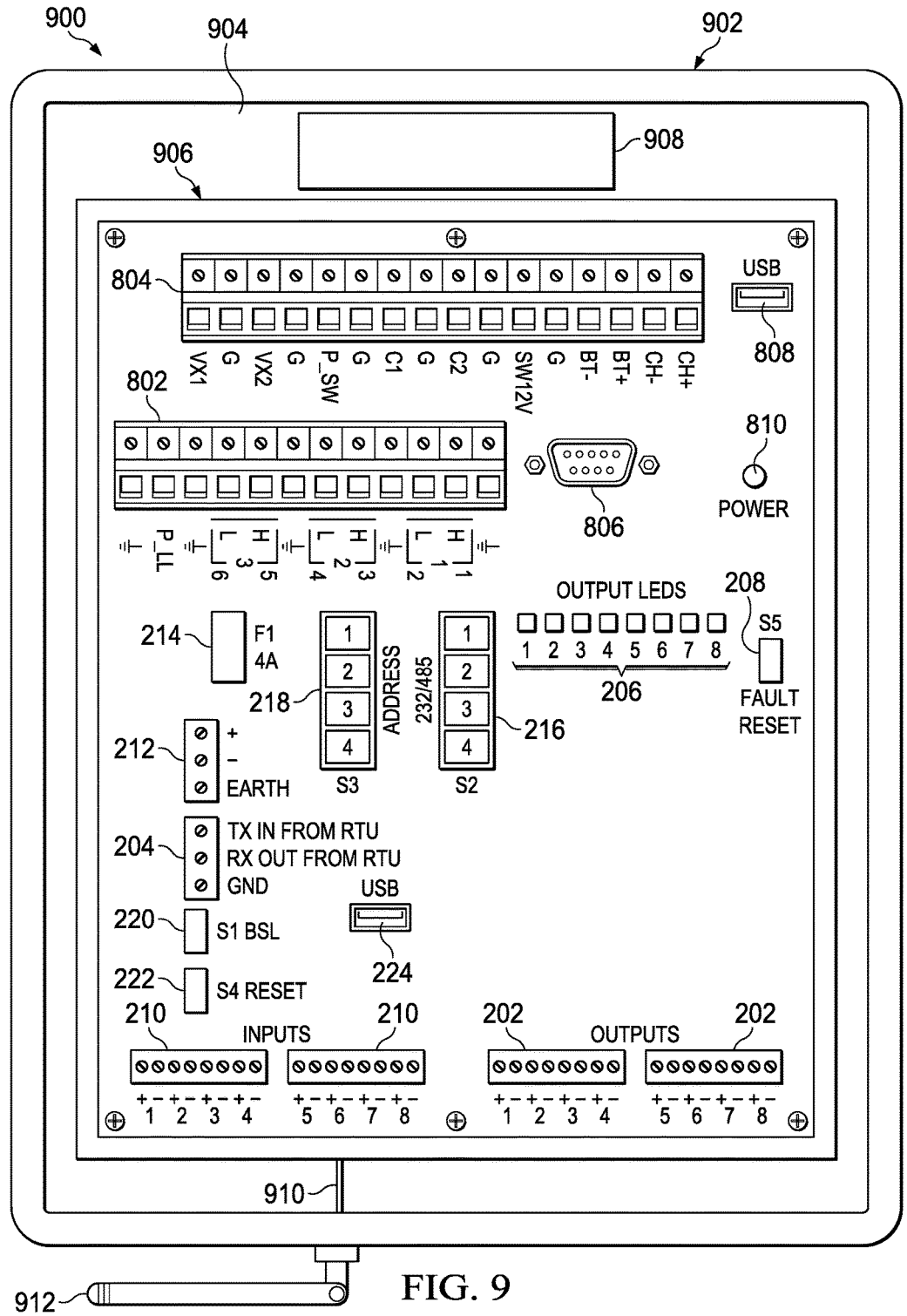
FIG. 9 illustrates one embodiment of a valve controller.

Referring now to FIG. 9, there is illustrated one embodiment of a valve controller 900. This valve controller may be used as the valve controller 100 in certain embodiments. The valve controller 900 includes an enclosure 902 having a cavity 904 in which a housing 906 resides. The housing 906 has within the board 200 and the board 800, disposed next to each other within the housing, with each of the board 200 and the board 800's respective terminals, connections, LED indicators, switches, and so forth, all viewable and available for connecting to power, sensors, solenoid valves, etc., as can be seen in FIG. 9. A battery 908 may also reside within the cavity, for providing power to the board 200 and/or the board 800. The boards 200 and 800 may be in communication via radio or wired connection. Additionally, there may be a wire 910 connected between the radio connector 812 of the board 800 and an antenna mounted to the outside of the housing enclosure 902. This allows for extended communication range for sensors positioned within irrigation zones, or with a host. Sensors that may be positioned within irrigation zones include volumetric water sensors, temperature sensors, etc.

Referring now to FIG. 10A, there is illustrated an RS-232 point-to-point configuration. The RS-232 point-to-point configuration includes an RS-232 host 1002 having a TX OUT connection, a RX IN connection, and a GND connection. The host 1002 connects to a valve controller 1004 having a TX IN/+ connection, an RX OUT/− connection, and a GND connection. The TX OUT, RX IN, and GND connections of the host 1002 are connected to the TX IN/+, RX OUT/−, and GND connections of the valve controller 1004, respectively.

Referring now to FIG. 10B, there is illustrated an RS-485 point-to-point configuration. The RS-485 point-to-point configuration includes an RS 485 host 1006 having a + connection, a − connection, and a GND connection. The host 1006 connects to the valve controller 1004. The +, −, and GND connections of the host 1006 are connected to the TX IN/+, RX OUT/−, and GND connections of the valve controller 1004, respectively.

Referring now to FIG. 10C, there is illustrated an RS-232 multidrop configuration. There is shown a plurality of valve controllers 1008 connected to the RS-232 host 1002. Each of the plurality of valve controllers 1008 have a TX IN/+ connection connected to the TX OUT connection of the host 1002, a RX OUT/− connection connected to the RX IN connection of the host 1002, and a GND connection connected to the GND connection of the host 1002. Wires are daisy-chained as shown in FIG. 10C to allow for the plurality of valve controllers 1008 to be connected to the single host 1002. The maximum number of valve controllers will be determined by the characteristics of the host device RS-232 port, cable length, and user poll loop timing requirements. Each of the plurality of valve controllers receives all transmissions from the host device. Each of the plurality of valve controllers holds its RX output in a high-impedance state until the valve controller receives a valid Modbus (or other protocol) poll whose ID matches the ID of the valve controller. Each of the plurality of valve controllers must have a different Modbus ID as set by the address switch S3.

Referring now to FIG. 10D, there is illustrated an RS-485 multidrop configuration. There is shown the plurality of valve controllers 1008 connected to the RS-485 host 1006. Each of the plurality of valve controllers 1008 have a TX IN/+ connection connected to the + connection of the host 1006, a RX OUT/− connection connected to the − of the host 1006, and a GND connection connected to the GND connection of the host 1006. Wires are daisy-chained as shown in FIG. 10D to allow for the plurality of valve controllers 1008 to be connected to the single host 1006. The maximum number of valve controllers will be determined by the characteristics of the host device RS-485 port, cable length, and user poll loop timing requirements. 120 ohm termination resistors may be required at the first and last unit, especially for longer cable lengths. Each of the plurality of valve controllers receives all transmissions from the host device. Each of the plurality of valve controllers holds its transmitter in a high-impedance state until the valve controller receives a valid Modbus (or other protocol) poll whose ID matches the ID of the valve controller. Each of the plurality of valve controllers must have a different Modbus ID as set by the address switch S3.

Referring now to FIG. 11A, there is illustrated a valve controller 1102, similar to the valve controller 100 previously described, but including a wired connected to a Public Switched Telephone Network (PSTN) 1104, for remote activation, in accordance with another embodiment.

Referring now to FIG. 11B, there is illustrated a valve controller 1106, similar to the valve controller 100 previously described, but including a wireless connection to a public cellular telephone network (PLMN) 1108, for remote activation, in accordance with another embodiment.

Referring now to FIG. 11C, there is illustrated a valve controller 1110, similar to the valve controller 100 previously described, but including an RS-232 data interface to a host for remote activation in accordance with another embodiment.

Referring now to FIG. 11D, there is illustrated a valve controller 1112, similar to the valve controller 100 previously described, but including an ethernet-type network interface for remote activation from a remote location 1114 via a global network 1116, for example, the Internet.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. It will be understood that the communication protocols described herein are used for illustrative purposes only. In addition to Modbus protocol, other protocols such as PakBus, DNP3, GOES, and other communication protocols may be used without departing from the spirit and scope hereof. Thus, it is intended that the following claims be interpreted to embrace all such further modifications, changes, rearrangements, substitutions, alternatives, design choices, and embodiments.

What is claimed is:

1. An irrigation control circuit board, comprising:
   a microprocessor;
   a plurality of output terminals configured for providing an output current to an irrigation valve in order to actuate the irrigation valve;
   a voltage boosting circuit, including:
      a DC-DC converter; and
      an output current boost capacitor;
      wherein the voltage boosting circuit boosts the output current to an actuating voltage, the actuating voltage being sufficient to actuate an irrigation valve and the actuating voltage being supplied to an irrigation valve driver;
   a power mitigation circuit configured to limit current spikes to the voltage boosting circuit; and
   at least one shunt monitor configured to monitor the output current as it is transferred between the irrigation valve driver and the plurality of output terminals.

2. The irrigation control circuit board of claim 1, wherein the actuating voltage is 15 volts.

3. The irrigation control circuit board of claim 1, wherein the output current boost capacitor has a capacitance of 4700 microfarads.

4. The irrigation control circuit board of claim 1, wherein the power mitigation circuit limits current spikes to less than 14 amperes.

5. The irrigation control circuit board of claim 1, further comprising a plurality of input terminals, each one of the plurality of input terminals configured to increment a counter for each time an irrigation valve is actuated.

6. The irrigation control circuit board of claim 1, further comprising a communications interface configured to receive and transmit information using RS-232 or RS-485 protocols.

7. The irrigation control circuit board of claim 6, further comprising a plurality of communication interface selection switches configured to allow for the selection of using either RS-232 or RS-485 protocol.

8. The irrigation control circuit board of claim 1, wherein the actuating voltage is 24 volts.

9. The irrigation control circuit board of claim 1, further comprising a plurality of output LEDs configured to provide a plurality of status indicators.

10. An irrigation control system, comprising:
a host;
at least one valve controller, the at least one valve controller including an irrigation control circuit board and a telemetry circuit board;
wherein the irrigation control circuit board, includes:
a microprocessor;
a plurality of output terminals configured for providing an output current to an irrigation valve in order to actuate the irrigation valve;
a voltage boosting circuit, including:
a DC-DC converter; and
an output current boost capacitor;
wherein the voltage boosting circuit boosts the output current to an actuating voltage, the actuating voltage being sufficient to actuate an irrigation valve and the actuating voltage being supplied to an irrigation valve driver;
a power mitigation circuit configured to limit current spikes to the voltage boosting circuit; and
at least one shunt monitor configured to monitor the output current as it is transferred between the irrigation valve driver and the plurality of output terminals; and
wherein the telemetry circuit board, includes:
a plurality of sensor input terminals for connecting to a plurality of sensors; and
an integrated radio configured to allow for wireless communication between the telemetry circuit board and the plurality of sensors, as well as to the host or the irrigation control circuit board.

11. The irrigation control system of claim 10, wherein the actuating voltage is 15 volts.

12. The irrigation control system of claim 10, wherein the output current boost capacitor has a capacitance of 4700 microfarads.

13. The irrigation control system of claim 10, wherein the power mitigation circuit limits current spikes to less than 14 amperes.

14. The irrigation control system of claim 10, wherein the irrigation control circuit board further includes a plurality of input terminals, each one of the plurality of input terminals configured to increment a counter for each time an irrigation valve is actuated.

15. The irrigation control system of claim 10, wherein the irrigation control circuit board further includes a communications interface configured to receive and transmit information using RS-232 or RS-485 protocols.

16. The irrigation control system of claim 15, wherein the at least one valve controller is connected to the host via the communications interface.

17. The irrigation control system of claim 16, wherein the at least one valve controller is connected to other valve controllers via the communications interface.

18. The irrigation control system of claim 17, wherein the irrigation control circuit board further includes a plurality of communication interface selection switches configured to allow for the selection of using either RS-232 or RS-485 protocol.

19. The irrigation control system of claim 10, wherein the actuating voltage is 24 volts.

20. The irrigation control system of claim 10, wherein the irrigation control circuit board further includes a plurality of output LEDs configured to provide a plurality of status indicators.

* * * * *